US011956721B2

(12) United States Patent
Kanamarlapudi et al.

(10) Patent No.: US 11,956,721 B2
(45) Date of Patent: Apr. 9, 2024

(54) 5G RADIO-AWARE POWER MANAGEMENT AT A WIRELESS LOCAL AREA NETWORK (WLAN) ACCESS POINT (AP) IN FIXED WIRELESS ACCESS (FWA) DEPLOYMENTS

(71) Applicant: QUALCOMM Incorporated, San Diego, CA (US)

(72) Inventors: Sitaramanjaneyulu Kanamarlapudi, San Diego, CA (US); Syam Krishna Babbellapati, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/224,916

(22) Filed: Apr. 7, 2021

(65) Prior Publication Data

US 2022/0330146 A1    Oct. 13, 2022

(51) Int. Cl.
*H04W 52/02* (2009.01)
*H04W 76/27* (2018.01)
*H04W 76/28* (2018.01)
*H04W 84/12* (2009.01)

(52) U.S. Cl.
CPC ....... *H04W 52/0216* (2013.01); *H04W 76/27* (2018.02); *H04W 76/28* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2011/0312288 A1* | 12/2011 | Fu | H04B 1/406 455/88 |
| 2012/0069766 A1* | 3/2012 | Fu | H04B 15/00 370/332 |
| 2012/0170557 A1 | 7/2012 | Tsfati et al. | |
| 2016/0316488 A1* | 10/2016 | Ko | H04W 52/0216 |

FOREIGN PATENT DOCUMENTS

EP    3021618 A1    5/2016

OTHER PUBLICATIONS

International Search Report and Written Opinion—PCT/US2022/019155—ISA/EPO—dated Jun. 13, 2022.

* cited by examiner

*Primary Examiner* — Jamaal Henson
(74) *Attorney, Agent, or Firm* — Holland & Hart LLP

(57) ABSTRACT

This disclosure provides systems, methods and apparatus, including computer programs encoded on computer storage media, for coordinating sleep modes between a wireless local area network (WLAN) access point (AP) and a cellular modem of an access point. In one aspect, the access point may obtain, from the cellular modem, information relating to a radio resource control (RRC) state transition or one or more power-saving events of the cellular modem and may select a power mode for the WLAN AP of the access device in accordance with the obtained information. In some implementations, selecting the power mode for the WLAN AP may include configuring the WLAN AP to either accept or reject a sleep mode request from a station (STA) served by the WLAN AP. As such, the access device may communicate with the STA using the WLAN AP in accordance with the accepted or rejected sleep mode request.

30 Claims, 8 Drawing Sheets

5G RADIO-AWARE POWER MANAGEMENT AT A WIRELESS LOCAL AREA NETWORK (WLAN) ACCESS POINT (AP) IN FIXED WIRELESS ACCESS (FWA) DEPLOYMENTS

TECHNICAL FIELD

This disclosure relates to wireless communications, including 5G radio-aware power management at a wireless local area network (WLAN) access point (AP) in fixed wireless access (FWA) deployments.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs), access points (APs), one or more network access nodes, each simultaneously supporting communication for multiple communication devices, which may be otherwise known as user equipment (UE) or wireless stations (STAs).

In some systems, an AP may communicate with a number of wireless STAs and, in some examples, the AP may manage communication between the AP and the wireless STAs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include connecting with a base station (BS) via a cellular modem associated with the access device, obtaining, from the cellular modem associated with the access device, one or more communication parameters associated with a connection state of the cellular modem with the BS, selecting a power mode for a wireless local area network (WLAN) access point (AP) associated with the access device in accordance with the one or more communication parameters associated with the connection state of the cellular modem, and communicating with one or more stations (STAs) served by the access device using the WLAN AP in accordance with the connection state of the cellular modem and the power mode for the WLAN AP.

Another innovative aspect of the subject matter described in this disclosure can be implemented in an apparatus for wireless communications at a UE. The apparatus may include a first interface, a second interface, and a processing system. The first interface may be configured to connect with a BS via a cellular modem associated with the access device. The first interface or the second interface may be configured to obtain, from the cellular modem associated with the access device, one or more communication parameters associated with a connection state of the cellular modem with the BS. The processing system may be configured to select a power mode for a WLAN AP associated with the access device in accordance with the one or more communication parameters associated with the connection state of the cellular modem. The first interface or the second interface may be further configured to communicate with one or more STAs served by the access device using the WLAN AP in accordance with the connection state of the cellular modem and the power mode for the WLAN AP.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to connect with a BS via a cellular modem associated with the access device, obtain, from the cellular modem associated with the access device, one or more communication parameters associated with a connection state of the cellular modem with the BS, select a power mode for a WLAN AP associated with the access device in accordance with the one or more communication parameters associated with the connection state of the cellular modem, and communicate with one or more STAs served by the access device using the WLAN AP in accordance with the connection state of the cellular modem and the power mode for the WLAN AP.

Another innovative aspect of the subject matter described in this disclosure can be implemented in another apparatus for wireless communications at a UE. The apparatus may include means for connecting with a BS via a cellular modem associated with the access device, means for obtaining, from the cellular modem associated with the access device, one or more communication parameters associated with a connection state of the cellular modem with the BS, means for selecting a power mode for a WLAN AP associated with the access device in accordance with the one or more communication parameters associated with the connection state of the cellular modem, and means for communicating with one or more STAs served by the access device using the WLAN AP in accordance with the connection state of the cellular modem and the power mode for the WLAN AP.

Another innovative aspect of the subject matter described in this disclosure can be implemented in a non-transitory computer-readable medium storing code for wireless communications at a UE. The code may include instructions executable by a processor to connect with a BS via a cellular modem associated with the access device, obtain, from the cellular modem associated with the access device, one or more communication parameters associated with a connection state of the cellular modem with the BS, select a power mode for a WLAN AP associated with the access device in accordance with the one or more communication parameters associated with the connection state of the cellular modem, and communicate with one or more STAs served by the access device using the WLAN AP in accordance with the connection state of the cellular modem and the power mode for the WLAN AP.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
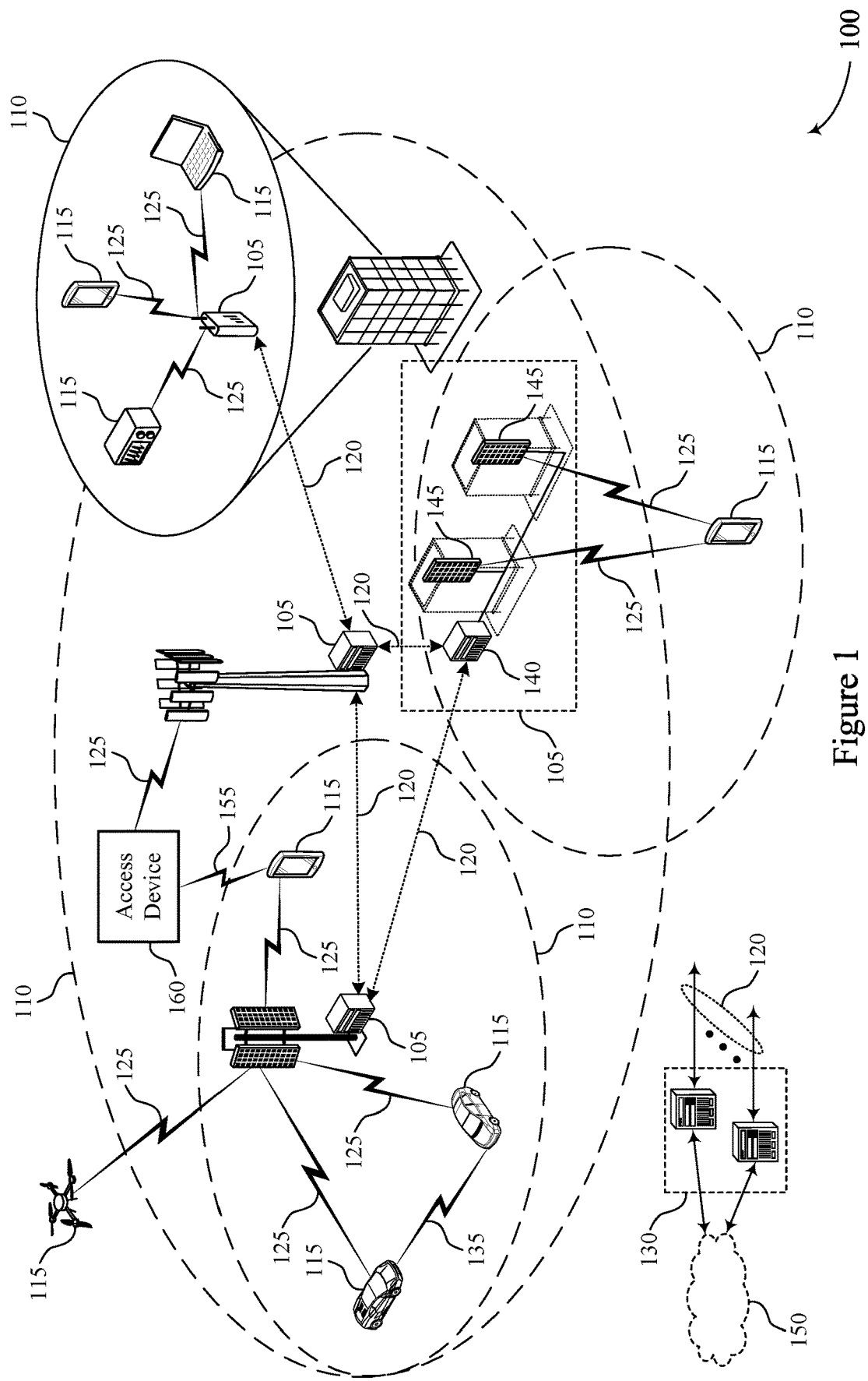
FIG. 1 illustrates an example wireless communications system that supports fifth generation (5G) radio-aware power management at a wireless local area network (WLAN) access point (AP) in fixed wireless access (FWA) deployments.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, an access device may function as a 5G customer premises equipment (CPE) and may include or otherwise feature a wireless local area network (WLAN) access point (AP) functionality and interface with a cellular network, such as a 5G network, via a cellular modem functionality. A WLAN AP and a cellular modem of the access device may be located at a same physical location (within a single box) or may be located at different physical locations (such as outside of a building and inside of the building). The cellular modem of the access device may operate in accordance with different radio resource control (RRC) connection states or various power-saving modes, which may influence or be associated with traffic flows between the access device and a network device, such as one or more components of a base station (BS). In some cases, the cellular modem may transition between the different RRC connection states during operation. Such RRC connection state transitions or power-saving mode events of the cellular modem also may influence traffic flows between the access device and one or more stations (STAs) that are served by the access device. In some examples, however, the WLAN AP functionality of the access device may be unaware of such RRC state transitions or power-saving mode events of the cellular modem and may accept or reject sleep mode requests from the one or more STAs in a manner that may potentially adversely affect the traffic flows between the access device and the one or more STAs, or vice versa.

In some implementations of the present disclosure, the access device, or a quality of service (QoS) manager of the access device, may obtain information relating to such RRC state transitions or power-saving mode events of the cellular modem and may select a power mode for the WLAN AP of the access device in accordance with the obtained information. In some examples, this selecting of the power mode for the WLAN AP may include configuring how the WLAN AP or the access device may manage (for example, accept or reject) sleep mode requests from the one or more STAs to maintain coordination and synchronization of sleep modes between the STAs and the cellular modem of the access device. For example, if the access device obtains an indication that the cellular modem is transitioning to an RRC idle state, the access device may select a power mode for the WLAN AP according to which the WLAN AP or the access device may accept any sleep mode requests from the one or more STAs. Alternatively, if the access device obtains an indication that the cellular modem is transitioning to an RRC connected state, the access device may select a power mode for the WLAN AP according to which the WLAN AP or the access device may reject any sleep mode requests from the one or more STAs.

Particular implementations of the subject matter described in this disclosure can be implemented to realize one or more of the following potential advantages. The described techniques may be implemented to achieve fine-grained sleep schedule or sleep mode coordination between both the WLAN AP functionality and the cellular modem functionality of the access device (for example, the 5G-CPE). As such, the STAs served by the access device may enter into a sleep mode (or refrain from entering into a sleep mode) in accordance with the activity of the cellular modem of the access device, which may avoid the entrance of a STA into a sleep mode if data (such as relatively high priority data) is currently mapped to or scheduled for that STA while also enabling the entrance of the STA into a sleep mode if data (or at least relatively high priority data) is not currently mapped to or scheduled for that STA. Accordingly, the STA may achieve a greater user experience as traffic flows avoid disruption due to asynchronous sleep schedules. Further, such transparency between the activity of the cellular modem between the cellular modem and the WLAN AP may result in an avoidance of the WLAN AP pulling the cellular modem out of a sleep mode (such as an RRC inactive state) for relatively low priority traffic, which may improve power savings at the access device. Additionally, such sleep schedule coordination between the one or more STAs and the cellular modem of the access device may be implemented to change (such as increase or decrease) transmission activity across the network environment (for example, between the STAs and the WLAN AP) without adversely impacting sleep schedules, which may result in lower overall system interference, greater spectral efficiency, and higher data rates, among other examples.

FIG. 1 illustrates an example wireless communications system 100 that supports 5G radio-aware power management at a WLAN AP in fixed wireless access (FWA) deployments. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, one or more components of the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and components of the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power-saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low latency communications, or various combinations thereof. For example, the wireless communications system 100 may be configured to support ultra-reliable low latency communications (URLLC) or mission critical communications. The UEs 115 may be designed to support ultra-reliable, low latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low latency, mission critical, and ultra-reliable low latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105). In some cases, a network device, such as a BS 105, may distribute different layers of functionality across physically separated components. For example, one or more of the BSs 105 described herein may operate as or otherwise implement a disaggregated radio access network (D-RAN) or an open radio access network (O-RAN).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

ABS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, the wireless communications system 100 may include an AP 160, which may be an example of a WLAN AP that is able to interface with a BS 105 via a communication link 125. The AP 160 may serve a STA, such as a UE 115, via a communication link 155. The communication link 155 may be an example of a wired connection or a wireless connection. In some implementations, the AP 160 may interface the cellular network via a cellular modem, such as a 5G modem, and may communicate with a STA via the WLAN AP functionality of the AP 160. As such, the AP 160 may feature cellular modem functionality and WLAN AP functionality and may be equivalently referred to as a 5G-CPE.

In some implementations, the AP 160 may obtain information relating to an RRC state transition or one or more power-saving events of the cellular modem and may select a power mode for the WLAN AP in accordance with the obtained information. Accordingly, the AP 160 may achieve sleep schedule coordination between both the cellular modem or 5G functionality of the AP 160 and the WLAN AP functionality of the AP 160.

Figure 2:
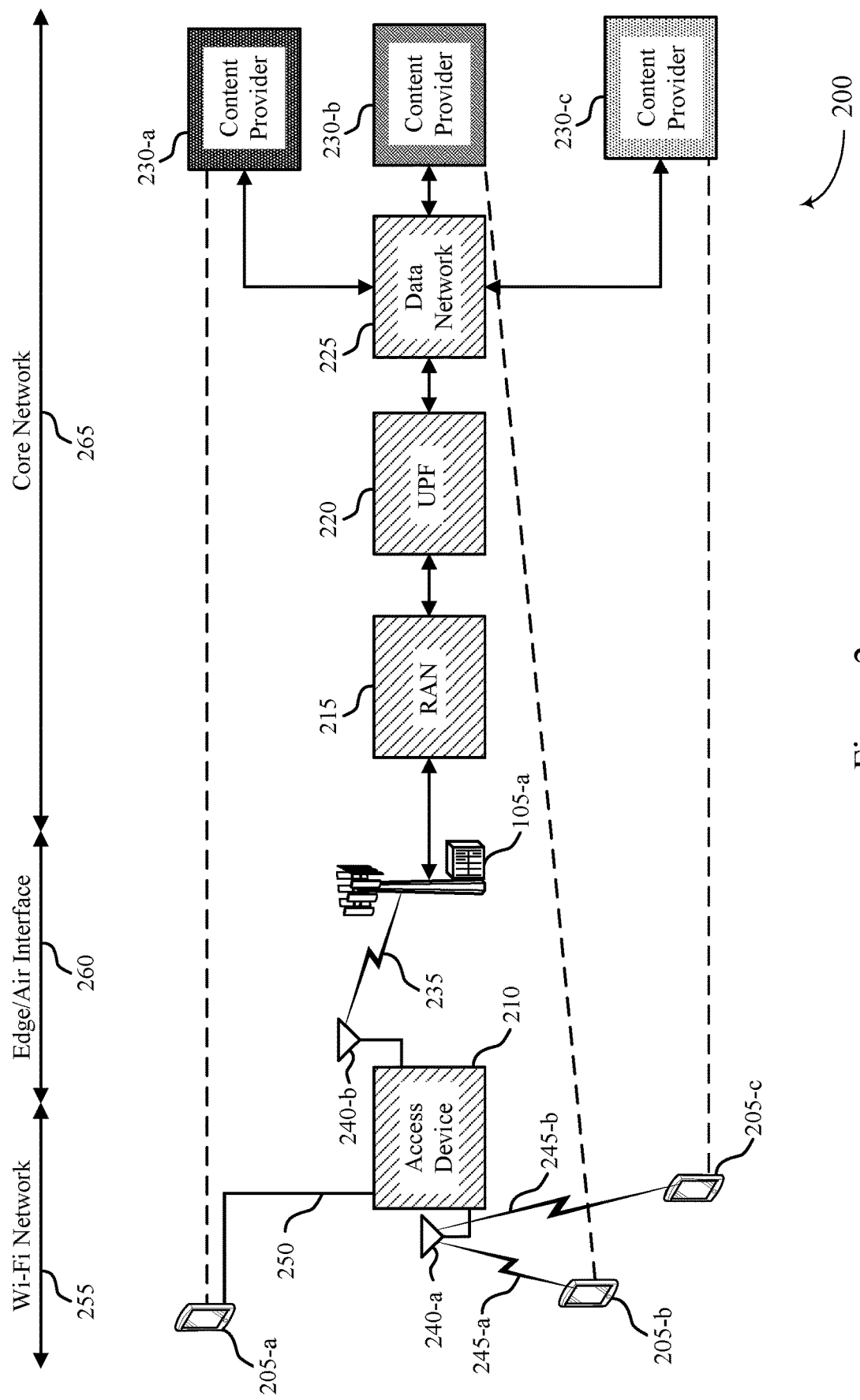
FIG. 2 illustrates an example network environment that supports 5G radio-aware power management at a WLAN AP in FWA deployments.

FIG. 2 illustrates an example network environment 200 that supports 5G radio-aware power management at a WLAN AP in FWA deployments. The network environment 200 may implement or be implemented to realize aspects of the wireless communications system 100. For example, the network environment 200 may illustrate communication between multiple STAs 205, an access device 210, and a BS 105-a, which may be examples of corresponding devices described herein, including with reference to FIG. 1. In some examples, the access device 210 may be an example of a 5G-CPE including a WLAN AP (such as a Wi-Fi modem or AP) and a cellular modem (such as a 5G modem) and may include a quality of service (QoS) manager interfacing the WLAN AP and the cellular modem. In some implementations, the QoS manager may select a power mode for the WLAN AP functionality of the access device 210 in accordance with various events or communication parameters associated with a connection state between the cellular modem and the BS 105-a. As such, the QoS manager may coordinate or synchronize power management actions (such as sleep schedules and connection states) between both the WLAN AP functionality and the cellular modem functionality of the access device 210.

The network environment 200 may include various air or area networks or interfaces, including a Wi-Fi network 255, an air interface 260 (which may be equivalently referred to as an edge interface), and a core network 265. The core network 265 may include several entities which may buffer, schedule, and transmit data provided from a set of content providers 230 to the BS 105-a. In some implementations, the core network 265 may include a radio access network (RAN) 215, a UPF 220, a data network 225, and the content providers 230. The data network 225 may transfer data between the content providers 230 and the UPF 220 through a process of data switching, system control, interconnection transmission lines, or a combination thereof. The UPF 220 may receive the data from the data network 225 and transmit the data to the RAN 215. In some examples, the UPF 220 may select or otherwise determine which elements of the data received from the data network 225 that the UPF 220 may buffer and may schedule the data transmission of the data to the RAN 215 to mitigate or otherwise reduce latency (for example, according to some scheduling timeline) or in accordance with current radio conditions.

Upon receiving the data from the UPF 220, the RAN 215 may schedule different sets of information (for example, different portions of the received data) to corresponding STAs 205. For instance, the RAN 215 may receive a first portion of data from a content provider 230-a, a second portion of data from a content provider 230-b, and a third portion of data from a content provider 230-c and may direct the first portion of data to the STA 205-a, the second portion of data to the STA 205-b, and the third portion of data to the STA 205-c in accordance with which content provide 230 each STA 205 is associated with (or which content provider 230 an application running at each STA 205 is associated with). As shown in FIG. 2, the associations between the content providers 230 and the STAs 205 are illustrated by dashed lines between the content providers 230 and the STAs 205. The RAN 215 may configure the scheduling policy, signal quality, or signal strength, or a combination thereof, to configure a time and a power at which the BS 105-a may transmit the data to the access device 210. The various elements of the core network 265 may work together to minimize latency and improve the overall QoS for the STAs 205. The RAN 215 may send the data to the BS 105-a, which may serve as a transition or interface between the core network 265 and the air interface 260.

The BS 105-a, upon receiving the data from the content providers 230 via the RAN 215, may transmit the data to the access device 210 via a communication link 235 (such as an over-the-air (OTA) cellular connection). In some examples, cellular communication may rely on a dynamic bandwidth that is dependent on one or more communication factors or variables and may experience dynamic or frequently changing radio conditions. For example, the BS 105-a may communicate with the access device 210 over the communication link 235 and, in some examples, communication over the communication link 235 may be sensitive to various environmental conditions. For instance, communication over the communication link 235 may be adversely affected by weather (such as rain or snow, among other examples) or physical barriers (such as cars, buildings, or trees, among other examples). In some examples, such environmental conditions, or the magnitude of their influence on the communication between the BS 105-a and the access device 210, may vary in a dynamic nature or according to relatively short timelines.

In some aspects, for example, the BS 105-*a* and the access device 210 may communicate over the communication link 235 using a millimeter wave (mmW) radio frequency band, which may be sensitive to such various environmental conditions. As a result of such dynamic radio conditions, the BS 105-*a* may adjust one or more communication parameters relatively frequently to increase the likelihood for successful communication between the BS 105-*a* and the access device 210 (for example, to provide a sufficiently strong signal to the access device 210).

In some examples, the access device 210 may communicate with the BS 105-*a* via the cellular modem of (or associated with) the access device 210. For example, the cellular modem may receive signaling sent over the communication link 235 from the BS 105-*a* using an antenna 240-*b*. In some implementations, the cellular modem of the access device 210 may be co-located with the WLAN AP of the access device 210 (and, as such, the access device 210 may be understood as one box). In some other implementations, the cellular modem of the access device 210 may be located at a different physical location than the WLAN AP of the access device 210 (and, as such, the access device 210 may be understood as two boxes). In such implementations in which the cellular modem and the WLAN AP of the access device 210 are separately located, the cellular modem may be located at an exterior of a building and the WLAN AP may be located within the building. Accordingly, the cellular modem may be referred to or otherwise understood as an outdoor data unit (ODU) and the WLAN AP may be referred to or otherwise understood as an indoor data unit (IDU). The WLAN AP and the cellular modem may communicate via any signaling mechanism, such as via a wired connection (for example, via an Ethernet cable) or a wireless connection.

Regardless of whether the cellular modem and the WLAN AP are co-located or located at different physical locations, the cellular modem may transmit the data received from the BS 105-*a* to the WLAN AP, which may send the data to the STAs 205. The WLAN AP may communicate with the STAs 205 in various ways, such as via a wired connection or via a wireless connection. For example, the WLAN AP may wirelessly communicate with the STA 205-*b* and the STA 205-*c* using the antenna 240-*a* via a wireless communication link 245-*a* and a wireless communication link 245-*b*, respectively. Additionally, or alternatively, the WLAN AP may communicate with the STA 205-*a* via a communication link 250 (such as an Ethernet or fiber optic connection). Further, although the network environment 200 shows one access device 210 and three STAs 205, the network environment 200 may include any number of access devices 210 that communicate with any number of STAs 205 without exceeding the scope of the present disclosure.

In some examples, the cellular modem may feature various connection states or power-saving modes that may assist with power conservation at the access device 210. Such connection states or power-saving modes may include various protocol data unit (PDU) session types, various resource control connection (RRC) states, or various discontinuous reception (DRX) cycle lengths, among other examples. Additional details relating to the various RRC connection states (such as RRC connected, RRC inactive, and RRC idle modes) according to which the cellular modem may operate are described in more detail herein, including with reference to FIG. 5.

Additionally, the WLAN AP also may reduce power consumption at the access device 210 by configuring or initiating a target wake time (TWT) with one or more STAs 205. For example, the WLAN AP may negotiate a "sleep time" with one or more STAs 205 and may signal a TWT to the one or more STAs 205 in accordance with the negotiated "sleep time." For example, the WLAN AP may signal a TWT to a STA 205 to configure the STA 205 to enter a sleep mode until the indicated TWT. The WLAN AP may similarly transmit an indication of one or more TWTs to one or more other STAs 205 that are served by the access device 210. In some aspects, such configuration of one or more TWTs for one or more STAs 205 may achieve greater power conservation at the one or more STAs 205 and, in some examples, the WLAN AP may employ the use of such TWTs during time periods of relatively low traffic. Additional details relating to the various connection states or power-saving modes that the cellular modem and the WLAN AP may implement are described herein, including with reference to FIG. 3.

As such, the cellular modem and WLAN AP may both implement one or more power-saving modes and, in some examples, the cellular modem and the WLAN AP may implement their respective power-saving modes independently of each other. In some examples, however, such a lack of coordination between the power-saving modes for the cellular modem and the WLAN AP may result in sub-optimal power management for the access device 210 or relatively poor user experience, or both. For example, if the WLAN AP is unaware that the cellular modem has entered an RRC idle or inactive state, the WLAN AP may pull the cellular modem out of a sleep mode during a time of relatively low priority traffic between the STAs 205 and the access device 210, thus increasing the overall power consumption of the access device 210 (instead of buffering the data and allowing the cellular modem to remain in the sleep mode).

Additionally, or alternatively, a lack of communication indicating low latency or high priority data between the cellular modem and the WLAN AP may result in a disruption of latency sensitive traffic. For example, the access device 210 may receive, from the BS 105-*a*, low latency data that is scheduled for or mapped to the STA 205-*a* and, if the WLAN AP is unaware that the cellular modem is in an RRC connected state or is receiving such high priority data, the WLAN AP may potentially configure or initiate a TWT for the STA 205-*a* that may conflict with such high priority data. Such a lack of transparency regarding power-saving modes between the cellular modem and WLAN AP may adversely impact or impede the transmission of time sensitive data to the STA 205-*a*, which also may adversely affect the user experience at the STA 205-*a*.

Additionally, or alternatively, a lack of awareness of the WLAN AP for the PDU session type of the cellular modem also may disrupt latency sensitive traffic. For example, an "Always-On" PDU session type may be associated with URLLC traffic and a "Normal" PDU session type may be associated with traffic featuring more lenient latency constraints. If the WLAN AP is unaware of a PDU session type mapping traffic to a STA 205, however, the WLAN AP may potentially configure or initiate a TWT with the STA 205 even if the cellular modem is operating in an "Always-On" PDU session type (such that URLLC traffic is potentially mapped to the STA 205). Such a lack of coordination between TWT configuration by the WLAN AP and data session type of the cellular modem may result in inefficient power management at the access device 210, delays to latency critical signaling, or a poor user experience, or a combination thereof.

In some implementations, the QoS manager of the access device 210 may receive communication from the cellular modem relating to various events or communication parameters associated with the connection state of the cellular modem and may select a power mode for the WLAN AP in accordance with the events or communication parameters. For example, the cellular modem may transmit, to the QoS manager, an indication of an RRC connection state transition, a type of a PDU session (such as a "Normal" PDU session type or an "Always-On" PDU session type), a DRX cycle length, or a mapping of a QoS indicator (which may be referred to as a 5QI in examples in which the access device 210 operates according to a 5G wireless technology), among other examples.

In accordance with the events or communication parameters obtained from the cellular modem, the QoS manager may allow or restrict various power-saving actions that the WLAN AP may operate in accordance with. For example, if latency sensitive traffic is scheduled or mapped to the STA 205-a, the QoS manager may configure or activate a power mode for the WLAN AP such that the WLAN AP refrains from configuring a TWT with the STA 205-a or rejects a request from the STA 205-a to enter a sleep mode until the access device 210 completes the transmission of the latency sensitive traffic. Additionally, or alternatively, the QoS manager also may obtain, from the WLAN AP, TWT states for one or more STAs 205 that are mapped to relatively high-priority traffic flows. As such, the QoS manager may inform the cellular modem of any scheduling restrictions resulting from such TWT states for the one or more STAs 205 that are mapped to the relatively high-priority traffic flows and the cellular modem may operate accordingly.

Such a communication of events or communication parameters between the cellular modem and the WLAN AP via the QoS manager may achieve more fine-grained sleep schedule coordination between the cellular modem and the WLAN AP, which may increase the likelihood for data to meet any relevant latency constraints (and thus improve user experience at a STA 205) as well as limit the possibility for the WLAN AP to pull the cellular modem out of a power-saving mode for non-low latency traffic (and thus improve power conservation at the access device 210). Additional details relating to such coordination between the cellular modem and WLAN AP via the QoS manger are described herein, including with reference to FIG. 3.

Figure 3:
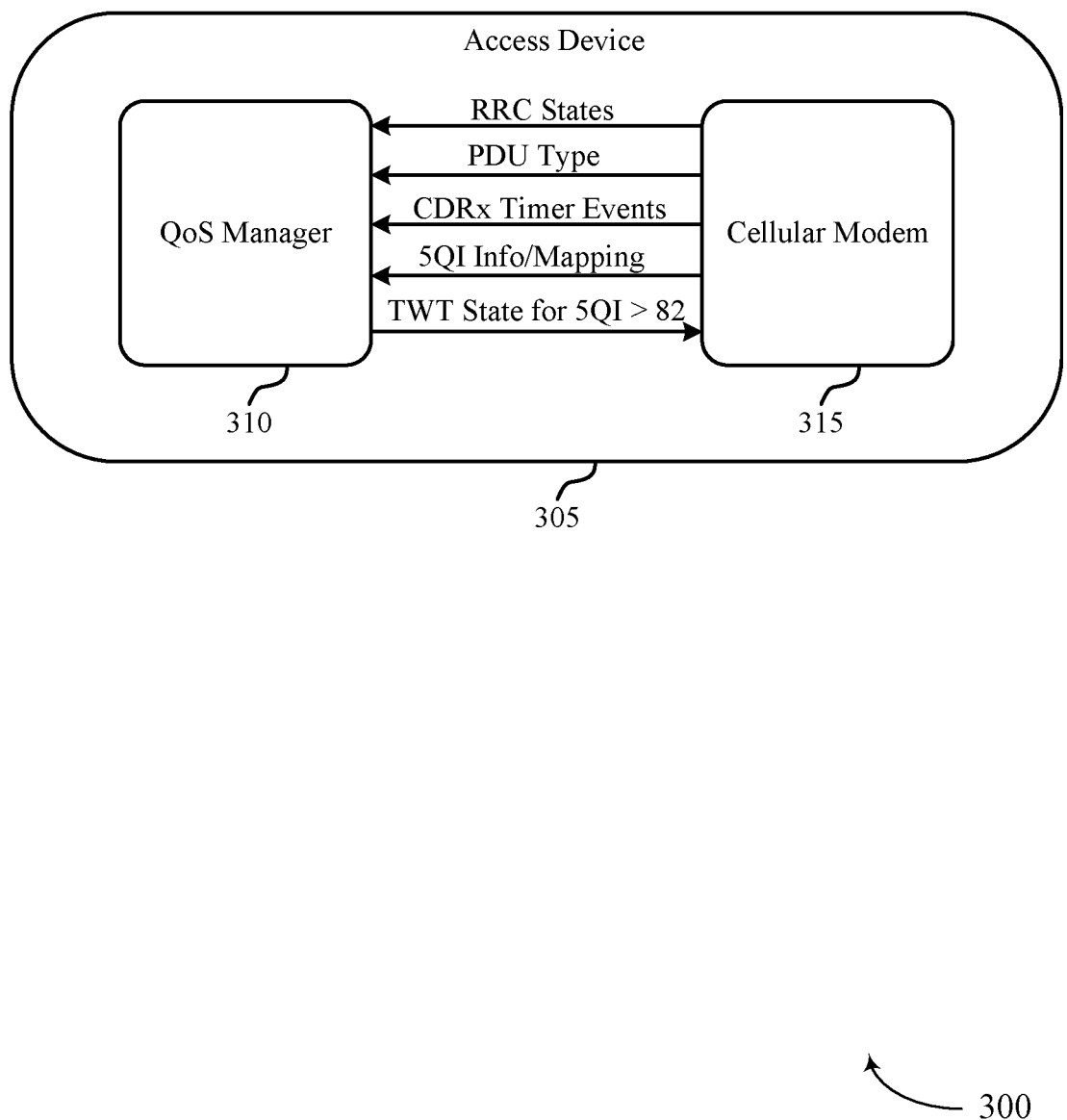
FIG. 3 illustrates an example signaling diagram that supports 5G radio-aware power management at a WLAN AP in FWA deployments.

FIG. 3 illustrates an example of a signaling diagram 300 that supports 5G radio-aware power management at a WLAN AP in FWA deployments. The signaling diagram 300 may implement or be implemented to realize aspects of the wireless communications system 100 or the network environment 200. For example, the signaling diagram 300 illustrates an access device 305 that may communicate with one or more components of a BS 105 via a cellular modem 315 of the access device 305 and with one or more STAs via a WLAN AP functionality of the access device 305 (and such devices may be examples of corresponding devices described herein, including with reference to FIGS. 1 and 2). The access device 305 may be an example of a WLAN AP or a Wi-Fi modem and, in some implementations, may function as a 5G-CPE or a FWA CPE.

In some examples, the access device 305 may include a QoS manager 310 (which may be an example of a Wi-Fi manager) interfacing the cellular modem 315. In some implementations, the QoS manager 310 may receive communication from the cellular modem 315 relating to various events or communication parameters associated with a connection state of the cellular modem 315 and the QoS manager 310 may select a power mode for the WLAN AP (for example, for the WLAN AP functionality of the access device 305) in accordance with the events or communication parameters. As such, the QoS manager 310 may coordinate or synchronize power management actions (such as sleep schedules and connection states) between the WLAN AP functionality of the access device 305 and the cellular modem 315.

For example, the cellular modem 315 may indicate various connection states or power-saving modes to the QoS manager 310 and the QoS manager 310 may select or otherwise configure a power-saving mode for the access device 305 (or for one or more STAs served by the access device 305) with consideration to the connection states or power-saving modes of the cellular modem 315. Such connection states or power-savings modes may include various RRC states, various PDU session types, various DRX cycle lengths, or mapping of a QoS data latency indicator (such as a 5QI in examples in which the access device 305 operates according to 5G wireless technology), among other examples. Example WLAN AP behavior to accommodate the power-saving states and connection state transitions of the cellular modem 315 are shown in and described with reference to Table 1.

TABLE 1

| 5G Modem Events | 5G CDRX | 5QI Value | "Normal" PDU Wi-Fi TWT Session | "Always-On" PDU Wi-Fi TWT Session |
|---|---|---|---|---|
| RRC_IDLE | Short DRX | 5QI < 82 (Normal latency) | Allow (trigger, announced) | NA |
| | | 5QI > 82 (Low latency) | Allow (non-trigger, un-announced) | NA |
| | Long DRX | 5QI < 82 (Normal latency) | Allow (trigger, announced) | NA |
| | | 5QI > 82 (Low latency) | Allow (trigger, announced) | NA |
| RRC_INACTIVE | Short DRX | 5QI < 82 (Normal latency) | Reject | Reject |
| | | 5QI > 82 (Low latency) | Reject | Reject |
| | Long DRX | 5QI < 82 (Normal latency) | Allow (non-trigger, un-announced) | Allow (non-trigger, un-announced) |
| | | 5QI > 82 (Low latency) | Allow (non-trigger, un-announced) | Allow (non-trigger, un-announced) |
| RRC_CONNECTED | Short | 5QI < 82 | Reject | Reject |

TABLE 1-continued

| 5G Modem Events | 5G CDRX | 5QI Value | "Normal" PDU Wi-Fi TWT Session | "Always-On" PDU Wi-Fi TWT Session |
|---|---|---|---|---|
| | DRX | (Normal latency) 5QI > 82 (Low latency) | Reject | Reject |
| | Long DRX | 5QI < 82 (Normal latency) | Reject | Reject |
| | | 5QI > 82 (Low latency) | Reject | Reject |

Table 1 provides examples of allowed power states for the WLAN AP in accordance with a connection state, a DRX cycle length, a 5QI value, and a PDU session type of the cellular modem 315 (or vice versa) to improve transmission of latency critical traffic and decrease power consumption of the access device 305. In some aspects, the various power-saving events that the cellular modem 315 may operate in accordance with may inform the WLAN AP as to whether the WLAN AP may reject or allow power-saving state requests (such as requests for a TWT) from the STAs.

A TWT may be triggered, non-triggered, announced, or un-announced. For example, if the WLAN AP configures a triggered TWT, the TWT may become effective or active as a result of the WLAN AP or a corresponding STA satisfying a triggering condition associated with the TWT. In such examples, the WLAN AP may announce the TWT, or the triggering condition for the TWT, to the STA (for example, via signaling). Alternatively, if the WLAN AP configures a non-triggered TWT, the TWT may become effective or active without the satisfying of a triggering condition associated with the TWT. In such examples, the WLAN AP may refrain from announcing the TWT to the STA. Further, in the announced TWT operation, a STA may announce the presence of the TWT to trigger the transmission of any data buffered at the WLAN AP. On the other hand, the un-announced TWT operation may allow the WLAN AP to transmit data to a STA that features an active TWT without announcing the data or receiving an announcement from the STA to transmit data to the STA.

In some implementations, the cellular modem 315 may support DRX operation such that cellular modem 315 may enter a DRX mode (such as a connected-mode DRX (CDRX) mode) for a duration of time. A DRX mode may be associated with a DRX timer and the cellular modem 315 may enter the DRX mode for a duration of the DRX timer. For example, the DRX timer may contain one or more DRX cycles and each DRX cycle may include an "on time" duration (a duration of time during which the cellular modem 315 may transmit and receive data) and an "off time" duration (a duration of time during which the cellular modem 315 may enter a sleep mode and may not transmit or receive data). In some aspects, the "off time" duration associated with the DRX mode may depend on the type of the DRX operation mode. For example, short DRX cycles and long DRX cycles may have an associated "off time" duration that is specific to their DRX cycle type such that the "off time" duration associated with the short DRX mode spans less time than the "off time" duration associated with the long DRX mode. The QoS manager 310 may select or otherwise configure the access device 305 (such as the WLAN AP functionality of the access device 305) into a power mode in accordance with an indication from the cellular modem 315 of a DRX mode of the cellular modem 315 in conjunction with other connection states or power-saving modes of the cellular modem 315.

In some implementations, for example, the cellular modem 315 may operate in accordance with various RRC connection states (such as an RRC connected state, an RRC inactive state, and an RRC idle state) and the QoS manager 310 may select a power mode for the access device 305 (such as the WLAN AP functionality of the access device 305) in accordance with the RRC connection state of the cellular modem 315. For example, if the QoS manager 310 receives an indication from the cellular modem 315 that the cellular modem 315 is operating in the RRC connected state (or is transitioning to the RRC connected state), QoS manager 310 may recognize or assume that the cellular modem 315 is (or will be) actively communicating with components of the BS 105 and, as such, may select a power mode for the access device 305 in accordance with the assumption that the cellular modem 315 is actively communicating with the BS 105. In some examples, for instance, the QoS manager 310 may select or otherwise configure the access device 305 into a power mode in which the access device 305 (for example, the WLAN AP functionality of the access device 305) rejects any requests from the one or more STAs served by the access device 305 to enter a sleep mode if the cellular modem 315 is operating in the RRC connected mode. In other words, the access device 305 may reject any TWT requests received from a STA served by the access device 305 or otherwise refrain from configuring a STA served by the access device 305 with a TWT.

Alternatively, if the QoS manager 310 receives an indication from the cellular modem 315 that the cellular modem 315 is operating in the RRC idle mode (or is transitioning to the RRC idle mode), the QoS manager 310 may recognize or assume that the cellular modem 315 is not actively communicating with the BS 105 and, as such, may select a power mode for the access device 305 in accordance with the assumption that the cellular modem 315 is not actively communicating with the BS 105. In some examples, for instance, the QoS manager 310 may select or otherwise configure the access device 305 into a power mode according to which the access device 305 (for example, the WLAN AP functionality of the access device 305) accepts any requests from the one or more STAs served by the access device 305 to enter a sleep mode if the cellular modem 315 is operating in the RRC idle mode. While TWT requests may be allowable while operating in the RRC idle mode, a TWT may be triggered or announced for a STA if the cellular modem 315 is in long DRX mode or a short DRX mode with non-low latency traffic mapped to the STA (such as traffic with an associated 5QI value less than approximately 82). If the cellular modem 315 is in a short DRX mode with low latency traffic mapped to the STA, the TWT may be non-triggered or un-announced.

Alternatively, if the QoS manager 310 receives an indication from the cellular modem 315 indicating that the cellular modem 315 is operating in the RRC inactive state (or is transitioning to the RRC inactive state), the QoS manager 310 may select a power mode for the access device 305 (for example, the WLAN AP functionality of the access device 305) in accordance with a DRX mode of the cellular modem 315. For example, if the QoS manager 310 receives an indication from the cellular modem 315 that the cellular modem 315 is in a long DRX mode, the QoS manager 310 may select a power mode for the WLAN AP such that the WLAN AP may allow a TWT request from a served STA. For a long DRX mode, the TWT for a STA may be non-triggered or un-announced regardless of the latency of traffic mapped to the STA. Alternatively, if the QoS manager 310 receives an indication from the cellular modem 315 that the cellular modem 315 is in a short DRX mode, the QoS manager 310 may reject any TWT request from a served STA.

In some implementations, the cellular modem 315 may operate in accordance with a type of PDU session (such as a "Normal" PDU session type or an "Always-On" PDU session type) and the QoS manager 310 may select a power mode for the access device 305 in accordance with the PDU session type of the cellular modem 315. For example, if the QoS manager 310 receives an indication from the cellular modem 315 that the cellular modem 315 is operating in accordance with the "Always-On" PDU session type (or is transitioning to the "Always-On" PDU session type), the QoS manager 310 may assume the cellular modem 315 is potentially mapping URLLC to one or more STAs and, as such, may select a power mode for the access device 305 (such as for the WLAN AP functionality of the access device 305) in accordance with the RRC state of the cellular modem 315.

In examples in which the cellular modem 315 is operating in accordance with the "Always-On" PDU session type and the RRC inactive state, for instance, the QoS manager 310 may select or otherwise configure the WLAN AP associated with the access device 305 with a power mode according to which the access device 305 (or the WLAN AP) may reject any TWT requests from served STAs if the cellular modem 315 is operating in accordance with a short DRX mode and according to which the access device 305 (or the WLAN AP) may accept any TWT requests from serve STAs if the cellular modem 315 is operating in accordance with a long DRX mode. Alternatively, in examples in which the cellular modem 315 is operating in accordance with the "Always-On" PDU session type and the RRC connected state, the QoS manager 310 may select or otherwise configure the WLAN AP associated with the access device 305 with a power mode according to which the access device 305 (or the WLAN AP) may reject any TWT requests from served STAs.

Alternatively, if the QoS manager 310 receives an indication from the cellular modem 315 indicating that the cellular modem 315 is operating in accordance with a "Normal" PDU session type (or is transitioning to the "Normal" PDU session type), the QoS manager 310 may select a power mode for the access device 305 (such as for the WLAN AP associated with the access device 305) in accordance with the RRC state and DRX mode of the cellular modem 315. For example, if the QoS manager 310 receives an indication from the cellular modem 315 that the cellular modem 315 is operating in accordance with the "Normal" PDU session type and the RRC connected state, the QoS manager 310 may configure a power mode for the WLAN AP of the access device 305 according to which the access device 305 (or the WLAN AP) may reject any TWT requests from served STAs. Alternatively, if the QoS manager 310 receives an indication from the cellular modem 315 that the cellular modem 315 is operating in accordance with the "Normal" PDU session type and the RRC idle state, the QoS manager 310 may configure a power mode for the WLAN AP of the access device 305 according to which the access device 305 (or the WLAN AP) may accept TWT requests from served STAs.

Alternatively, if the QoS manager 310 receives an indication from the cellular modem 315 that the cellular modem 315 is operating in accordance with the "Normal" PDU session type and the RRC inactive state, the QoS manager 310 may select a power mode for the access device 305 (such as for the WLAN AP of the access device 305) in accordance with the DRX mode of the cellular modem 315. For example, if the QoS manager 310 receives an indication from the cellular modem 315 that the cellular modem 315 is operating in accordance with the "Normal" PDU session type, the RRC inactive state, and the short DRX mode, the QoS manager 310 may configure a power mode for the WLAN AP of the access device 305 according to which the access device 305 (or the WLAN AP) may reject any TWT requests from served STAs. Alternatively, if the QoS manager 310 receives an indication from the cellular modem 315 that the cellular modem 315 is operating in accordance with the "Normal" PDU session type, the RRC inactive state, and the long DRX mode, the QoS manager 310 may configure a power mode for the WLAN AP of the access device 305 according to which the access device 305 (or the WLAN AP) may accept TWT requests from served STAs.

In some implementations, the cellular modem 315 may transmit or receive a QoS data latency indicator (in the form of a 5QI value), which may correspond to a data traffic and may indicate a priority for the transmission of the corresponding data traffic. For example, if the cellular modem 315 receives data associated with a relatively high 5QI value (such as a 5QI value greater than 82), the cellular modem 315 may recognize or otherwise determine that the data is associated with a low latency traffic flow (such as a delay-critical data with a guaranteed bit rate (GBR)). The cellular modem 315 may identify and map such low latency traffic flows for tracking between the QoS manager 310 and the STAs.

For example, a 5G wireless communication system may define 5QI values associated with a set of QoS parameters and constraints. For example, a 5QI value of "1" may define a GBR having a default priority level of "20," a packet delay budget of 100 ms, a packet error rate no greater than $10^{-2}$, and a default averaging window of 2000 ms. The 5QI value of "1" may be suitable for conversational voice service. Other 5QI values may be associated with different sets of QoS parameters suitable for various services. A network slice that is created for a URLLC service may have a 5QI value that includes more stringent QoS parameters. As an example, a 5QI value of 80, 82, or greater may have QoS parameters that support end-to-end latency that includes air interface round-trip latency as well as the latency through other components of the network slice. URLLC may be associated with a 5QI value that has a Delay Critical GBR (such as 5QI value>=80 or 5QI value>=82). Thus, the 5QI value>=80 or 5QI value>=82 also may satisfy the 1 ms round trip latency of the air interface.

In addition to the network slice type or service type, one or more operators can define a slice type or service type with the characteristics associated with the operators. Specifically, wireless communication networks allow for customized network slices to be created and serviced using different 5QI parameters. Additionally, or alternatively, wireless communication networks that support network slicing may account for end-to-end latencies. In some examples, end-to-end latencies may include the application latencies on a UE. In some examples, the application latencies for different applications may be 3-5 ms for the URLLC service type. In some implementations, accounting for application latency as part of an overall end-to-end latency (for example, an end-to-end latency between an application and a 5G core network). In an example of a live audio performance that may be associated with an application and a 5G core network, there may exist a deterministic latency to receive the live audio over a wireless communication network and an application latency associated with processing a live audio at a UE.

As such, if the QoS manager 310 receives an indication from the cellular modem 315 that the cellular modem 315 is receiving low latency data (as indicated by a 5QI value), the QoS manager 310 may select a power mode for the access device 305 (for the WLAN AP of the access device 305) in accordance with the receiving of the low latency data by the cellular modem 315. For instance, if the 5QI value indicates, to the QoS manager 310, that some associated data (which is mapped to a STA) is associated with a low latency traffic flow, the QoS manager 310 may configure a power mode for the WLAN AP according to which the access device 305 (or the WLAN AP) rejects a TWT request from the STA. Alternatively, in some other examples, the QoS manager 310 may receive a 5QI value associated with data that is mapped to a STA from the cellular modem 315 that corresponds to a non-low latency traffic flow. In such examples, the QoS manager 310 may configure a power mode for the WLAN AP according to which the access device 305 (or the WLAN AP) accepts or rejects a TWT request from the STA in accordance with other events or parameters, as shown in Table 1.

In some aspects, communication of the various connection state or power mode transitions between the cellular modem 315 and the QoS manager 310 (which may be referred to as events) may rely on coordination between the cellular modem 315 and the QoS manager 310. For example, dynamic radio adaptation and configuration logics (controlled by L1 or medium access control (MAC) signaling) may rely on efficient transmission of such events from the cellular modem 315 to the QoS manager 310 to ensure fine-grained coordination between connection states and power modes of the cellular modem 315 and the WLAN AP. In some examples, the cellular modem 315 may transition between various radio access technologies (RATs) (such as moves or transitions between 5G, LTE, or W-CDMA, among other examples) to ensure this fine-grained coordination and, in some implementations, may transmit an indication of such RAT transitions to the QoS manager 310.

For example, depending on channel conditions or external factors, including weather (such as rain or snow, among other examples) or physical barriers (such as cars, buildings, or trees among other examples), the cellular modem 315 may transition from a first RAT (such as 5G) to a second RAT (such as LTE) to improve signal strength and transmission of data between the cellular modem 315 and one or more components of the BS 105. Similarly, the cellular modem 315 also may transition between frequency bands (which may correspond to the RAT in use). For example, if the cellular modem 315 transitions from 5G to LTE, the cellular modem 315 may move from a mmW frequency band to a sub-6 (below 6 GHz) frequency band. The RAT transitions and RAT-specific band movements may help to improve transmission of data from the BS 105 to the STAs, thus improving the coordination between the cellular modem 315 and WLAN AP. Further, in some implementations, the QoS manager 310 may configure a power mode for the WLAN AP in accordance with such RAT or frequency band transitions. Additionally, or alternatively, the QoS manager 310 may receive an indication from the cellular modem 315 relating to a number of subcarriers or a BWP (or transitions thereof), and may configure a power mode for the WLAN AP in accordance with the indicated number of subcarriers or BWP.

The cellular modem 315 may communicate with both the BS 105 and the QoS manager 310 (for example, may interface both a WLAN and a cellular network) and, as such, the cellular modem 315 may select a connection state or a power-saving mode in accordance with (for example, in view of) data traffic from both the WLAN and the cellular network. Such selection of a connection state or a power-saving mode in accordance with or in view of data traffic from both the WLAN and the cellular network may result in greater communications efficiency between the WLAN and the cellular network. Further, the cellular modem 315 also may transmit multiple streams of data, mapped to various STAs, such that if a STA requests a change of connection state of the cellular modem 315, the request may adversely affect the flow of data traffic to the other STAs served by the access device 305. As such, the STAs and the WLAN AP functionality of the access device 305 may refrain from requesting a change of connection state or a power-saving mode of the cellular modem 315. In other words, in some implementations, the QoS manager 310 may select a power mode for the WLAN AP in view of the connection state or the power-saving mode of the cellular modem 315 and may refrain from selecting a connection state or a power-saving mode for the cellular modem 315 in view of the power mode of the WLAN AP.

As a result of communicating connection state, power-saving mode, and radio network events or transitions between the cellular modem 315 and the WLAN AP via the QoS manager 310, the access device 305 may achieve more fine-grained sleep schedule coordination between the cellular modem 315 and the WLAN AP of the access device 305. Such fine-grained coordination may increase the likelihood for data to meet relevant latency constraints, improve the user experience at the STAs served by the access device 305, and increase throughput within the wireless communications system. Further, such sleep schedule coordination may limit or reduce the likelihood of the WLAN AP pulling the cellular modem 315 out of a power-saving mode for non-low latency traffic, thus improving overall power conservation at access device 305.

Figure 4:
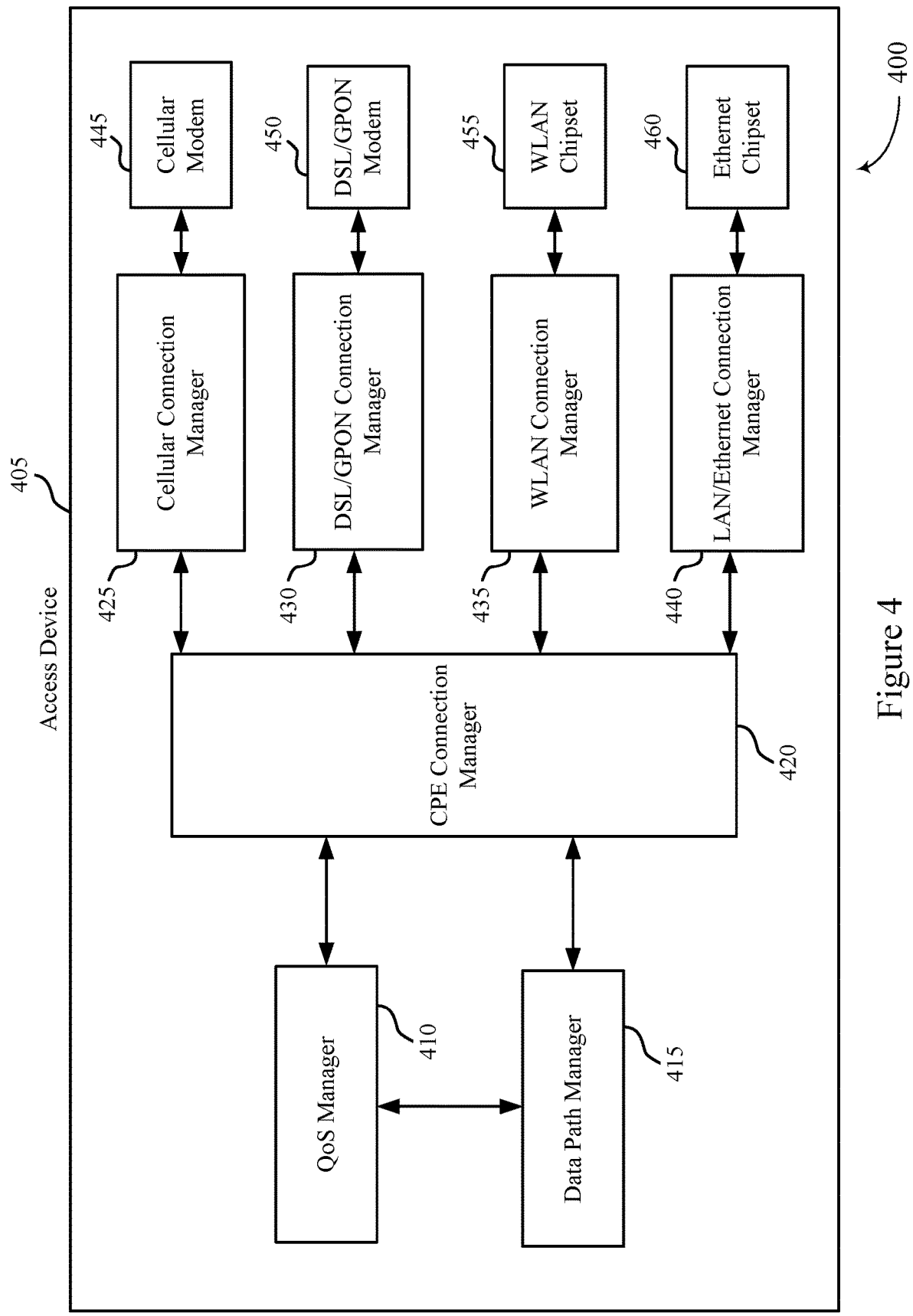
FIG. 4 illustrates an example block diagram of an example access device that supports 5G radio-aware power management at a WLAN AP in FWA deployments.

FIG. 4 illustrates an example block diagram 400 of an example access device 405 that supports 5G radio-aware power management at a WLAN AP in FWA deployments. The access device 405 may implement or be implemented to realize aspects the wireless communications system 100, the network environment 200, the signaling diagram 300, or a combination thereof. For example, the access device 405 may include a cellular modem 445 for communication with one or more components of a BS 105 (for example, the cellular modem 445 may be an example of a cellular or 5G interface of the access device 405), and a WLAN chipset 455 that may communicate with one or more wireless STAs, and such devices and components may be examples of corresponding devices and components described herein, including with reference to FIGS. 1, 2 and 3.

In some implementations, the access device 405 may include a QoS manager 410, a data path manager 415, a CPE connection manager 420, and one or more other components including the cellular modem 445, a digital subscriber line (DSL)/gigabit passive optical network (GPON) modem 450, the WLAN chipset 455, and an ethernet chipset 460. Such modems and chipsets may establish or manage wired or wireless connections with various external devices (such as a BS 105 or one or more STAs, among other examples). For example, one or more components of the BS 105 may communicate with the access device 405 via the cellular modem 445 or the DSL/GPON modem 450 (both of which may act as a wide area network (WAN) interface for the access device 405) and the one or STAs may communicate with the access device 405 via the WLAN chipset 455 (for wireless communication) or the ethernet chipset 460 (for wired or cable-based communication). These components may interface with the CPE connection manager 420 via respective connection managers, including a cellular connection manager 425, a DSL/GPON connection manager 430, a WLAN connection manager 435, and a local area network (LAN)/Ethernet connection manager 440, as illustrated in FIG. 4.

The access device 405 may configure the CPE connection manager 420 to mediate or manage a flow of traffic or setup connections between the WAN interface (the cellular modem 445 and DSL/GPON modem 450) and the LAN interface (the WLAN chipset 455 and the ethernet chipset 460). For example, the cellular modem 445 may indicate, to the CPE connection manager 420, traffic that is mapped to one or more wireless STAs and the CPE connection manager 420 may perform traffic switching and traffic steering to control data traffic from the cellular modem 445 to the WLAN chipset 455, which may in turn transmit the data traffic to the one or more STAs that the traffic is mapped to. In some aspects, the CPE connection manager 420 may act as an intermediary between the WAN and LAN interfaces and the QoS manager 410 and data path manager 415. For example, the CPE connection manager 420 may indicate connection state or power-saving transitions or events (such as an RRC state transition, a PDU session type, a DRX mode, a QoS traffic indicator, or TWT states) from the WAN and LAN interfaces to the QoS manager 410, which may configure a power mode for the WLAN AP functionality of the access device 405 in accordance with the indicated transitions or events. Accordingly, the WLAN AP, or the WLAN chipset 455, may accept or reject various sleep requests (such as TWT requests) from the STAs served by the access device 405 in accordance with the configured power mode.

The access device 405 may configure the QoS manager 410 to determine whether various new traffic flows may be admitted into the existing flow of traffic. A traffic flow may be a logical relationship between a LAN client connected to a LAN interface and a network slice established via a WAN interface. Each traffic flow may be configured to support a 5QI for a network slice. The QoS manager 410 may be configured to control admission of new traffic flows and sustain the committed traffic flows. In some examples, the QoS manager 410 may be configured to determine one or more QoS parameters (or 5QI values) associated with a 5G network (such as a 5G WAN or a 5G WLAN). In such implementations, the QoS manager 410 may be configured to coordinate the traffic flows on the LAN (such as Ethernet and Wi-Fi) as well as the 5G WAN or the 5G WLAN (such as DSL/GPON). For example, if the cellular modem 445 maps traffic to the LAN interface with an associated QoS parameter associated with low latency traffic (such as a 5QI>82), the QoS manager 410 may schedule such low latency traffic for transmission ahead of other data traffic with less latency critical data.

In some implementations, the access device 405 may configure the data path manager 415 to handle the flow of traffic. For example, the data path manager 415 may handle traffic switching, traffic steering, maintain traffic statistics, and communicate the traffic to the various interfaces of the access device 405 (such as the WAN interface and LAN interface). In some examples, the QoS manager 410 may indicate, to the data path manager 415, which flows of traffic to allow or reject and the corresponding latency of the traffic (indicated by the 5QI value associated with the traffic). In some examples, the access device 405 may be configured to manage traffic received or transmitted by the cellular connection manager 425, the DSL/GPON connection manager 430, the WLAN connection manager 435, and the LAN/Ethernet connection manager 440.

The access device 405 may couple the CPE connection manager 420, the QoS manager 410, and the data path manager 415 together such that the three modules may facilitate the flow of traffic from the BS 105 to the STAs, and the flows of traffic may be rejected, allowed, or buffered to operate in accordance with the example behavior shown by Table 1. Thus, the access device 405 may increase the likelihood for the traffic flows to meet any relevant latency constraints and improve the user experience at the STAs.

Figure 5:
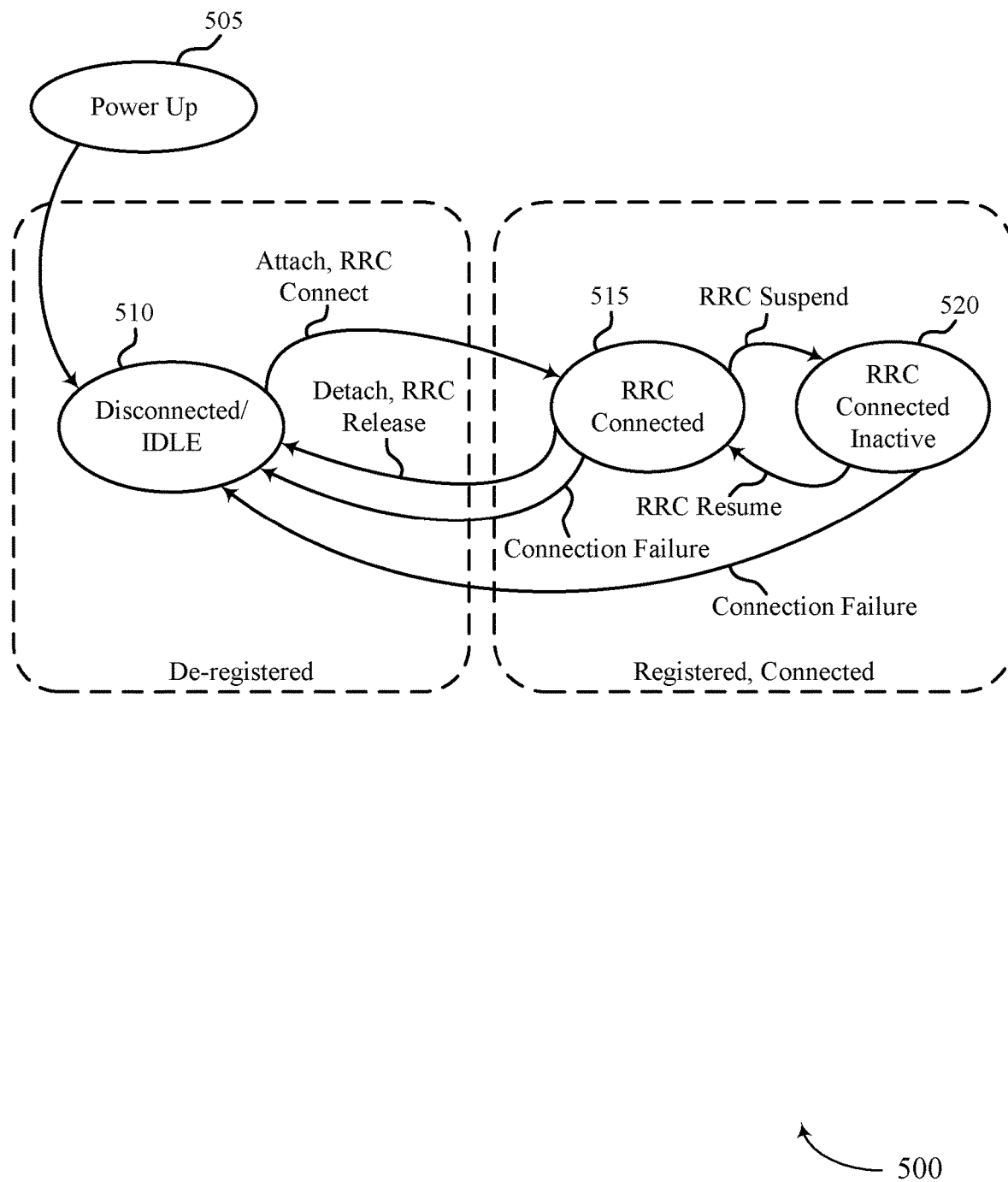
FIG. 5 illustrates example radio resource control (RRC) state transitions that support 5G radio-aware power management at a WLAN AP in FWA deployments.

FIG. 5 illustrates example RRC state transitions 500 that support 5G radio-aware power management at a WLAN AP in FWA deployments. The RRC state transitions 500 may implement or be implemented to realize aspects of the wireless communications system 100, the network environment 200, the signaling diagram 300, the access device 405, or a combination thereof. For example, the RRC state transitions 500 illustrates various RRC power states (such as an RRC idle state 510, an RRC connected state 515, and an RRC inactive state 520) that an access device may operate in accordance with. In some implementations, the access device may transmit an indication of the RRC state transitions 500 to a QoS manager and the QoS manager may use the indications to coordinate and synchronize power management actions between a WLAN AP functionality of the access device and a cellular modem of the access device.

In some examples, the access device may be in a power off state and may transition to a power on state via a power up 505 sequence in which the access device may enter an RRC state. For example, as a result of power up 505, the access device may enter and operate in accordance with the RRC idle state 510 (which may be equivalently referred to as an RRC disconnected state). In some aspects, the access device may transition from the RRC idle state 510 to the RRC connected state 515 to begin communication with a cellular network.

For example, the access device may transmit an RRC connection request to a BS 105, which may accept the request and configure the access device to transition to the RRC connected state 515 and begin communicating with one or more components of the BS 105. In some implementations, the access device may transmit an indication of this state transition to the QoS manager.

In some examples, the access device may transition from the RRC connected state 515 to the RRC inactive state 520 (which may be equivalently referred to as an RRC connected inactive state). For example, during a period of low traffic or non-latency critical traffic, the access device may suspend the RRC connection for a duration of time by entering the RRC inactive state 520 and, in some examples, may resume its RRC connected state 515 after the duration of time. For example, the access device may transition back the RRC connected state 515 from the RRC inactive state 520 and resume communications with the BS 105. In some implementations, the access device may transmit an indication of this transition to the QoS manager. Alternatively, in some other examples, the access device may transition from the RRC inactive state 520 to the RRC idle state 510 (for example, if the access device experiences a connection failure with the BS 105). In some implementations, the access device may transmit an indication of this state transition to the QoS manager.

In some examples, the access device may transition from the RRC connected state 515 to the RRC idle state 510. For instance, the access device may perform an RRC release or detach procedure and transition to the RRC idle state 510 to minimize both RAN and core network signaling overhead and decrease the access device power consumption. Additionally, or alternatively, the access device may experience a connection failure with the network and may transition to the RRC idle state 510 as a result of the connection failure. In some implementations, the access device may transmit an indication of the transition from the RRC connected state 515 to the RRC idle state 510 to the QoS manager.

Figure 6:
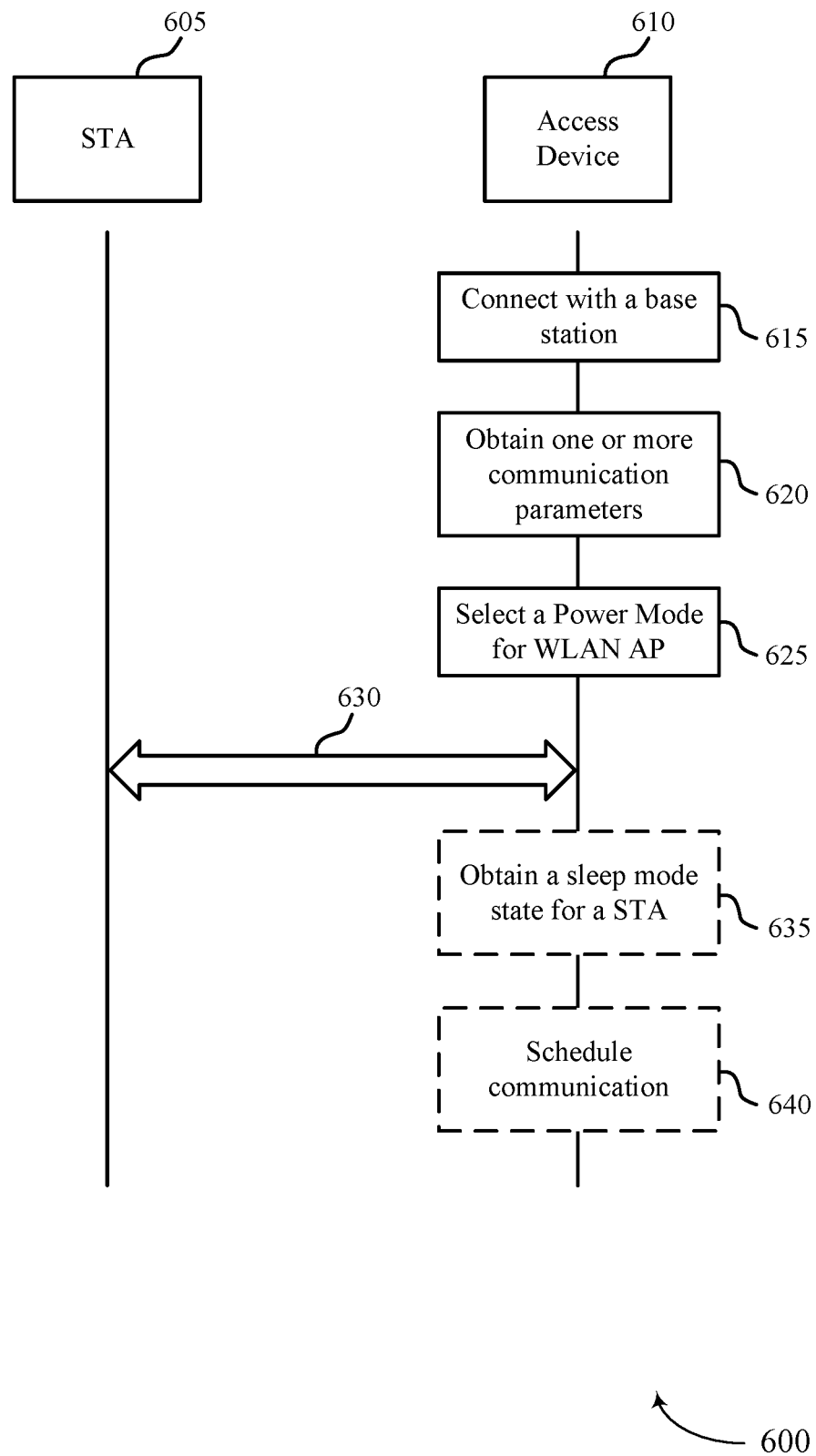
FIG. 6 illustrates an example process flow that supports 5G radio-aware power management at a WLAN AP in FWA deployments.

FIG. 6 illustrates an example of a process flow 600 that supports 5G radio-aware power management at a WLAN AP in FWA deployments. In some examples, process flow 600 may implement aspects of the wireless communications system 100, the network environment 200, the signaling diagram 300, the access device 405, or a combination thereof. For example, the process flow 600 may illustrate communication between a STA 605 and an access device 610, which may be examples of corresponding devices described herein, including with reference to FIGS. 1-4.

Alternative examples of the following may be implemented, in which some steps are performed in a different order than described or are not performed at all. In some aspects, steps may include additional features not mentioned below, or further steps may be added. In addition, while the process flow 600 shows processes between a single access device 610 and a single STA 605, these processes may occur between any number of access devices 610 and STAs 605.

At 615, the access device 610 may connect with one or more components of a BS 105 via a cellular modem associated with access device 610. For example, the access device 610 may be an example of a 5G-CPE that interfaces both a WLAN and a cellular network, such as a 5G network, and may establish a communication link with a BS 105 using the cellular network via the cellular modem.

At 620, the access device 610 may obtain, from the cellular modem, one or more communication parameters associated with a connection state of the cellular modem. The one or more communication parameters associated with the connection state of the cellular modem may include an indication of an RRC connection state transition, a PDU session type, a DRX mode, a RAT transition, a radio frequency band transition, a QoS condition of a traffic flow (such as a 5QI value), a priority of a traffic flow, or a combination thereof.

At 625, the access device 610 may select a power mode for a WLAN AP associated with the access device 610 in accordance with the one or more communication parameters associated with the connection state of the cellular modem. For example, the access device 610 (a 5G-CPE) may include or otherwise be coupled with both a cellular modem and a WLAN AP and may select a power mode for the WLAN AP in accordance with the connection state or any active power-saving modes of the cellular modem. In some implementations, such a power mode for the WLAN AP may include a configuring of the WLAN AP or the access device 610 to either allow or reject a sleep mode request (such as a TWT request) from the STA 605.

At 630, the access device 610 may communicate with the STA 605 served by the access device 610 using the WLAN AP in accordance with the connection state of the cellular modem and the power mode for the WLAN AP. In some implementations, such communication between the WLAN AP and the STA 605 may involve communicating in accordance with whether the access device 610 (or the WLAN AP of the access device 610) allows or rejects a sleep mode request (such as a TWT request) from the STA 605.

At 635, the access device 610 may obtain a sleep mode state for the STA 605 and the STA 605 may be associated with a traffic flow having a priority greater than a threshold priority. For example, the access device 610 may keep track of sleep mode states or TWTs for the STA 605 if the STA 605 is associated with a relatively higher priority traffic flow (such as a traffic flow associated with a 5QI value that is greater than 82).

At 640, the access device 610 may schedule communication to the STA 605 that is associated with the traffic flow having the priority greater than the threshold priority in accordance with the sleep mode state for the STA 605. For example, the access device 610 may buffer the traffic flow scheduled for or mapped to the STA 605 and schedule the transmission of the traffic flow to the STA 605 once the STA 605 exits the current sleep mode state of the STA 605.

Figure 7:
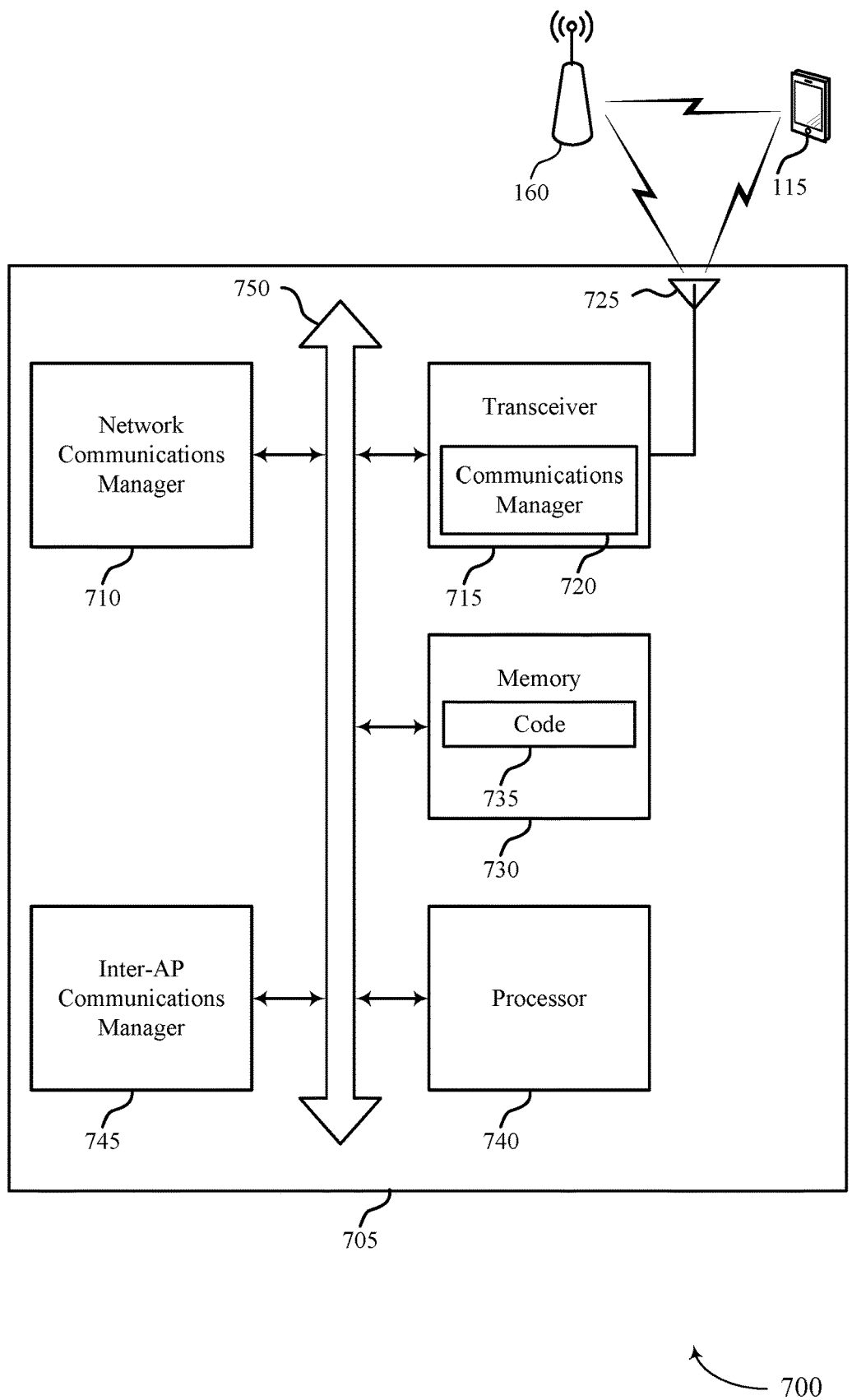
FIG. 7 shows a block diagram of an example AP that supports 5G radio-aware power management at a WLAN AP in FWA deployments.

FIG. 7 shows a block diagram 700 of an example device 705 that supports 5G radio-aware power management at a WLAN AP in FWA deployments. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-AP communications manager 745. These components may be in electronic communication or otherwise coupled (for example, operatively, communicatively, functionally, electronically, or electrically) via one or more buses (for example, a bus 750).

The network communications manager 710 may manage communications with a core network (for example, via one or more wired backhaul links). For example, the network communications manager 710 may manage the transfer of data communications for client devices, such as one or more STAs.

In some examples, the device 705 may include a single antenna 725. However, in some other examples, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets and provide the modulated packets to one or more antennas 725 for transmission, and to demodulate packets received from the one or more antennas 725.

The memory 730 may include random-access memory (RAM) and read-only memory (ROM). The memory 730 may store computer-readable, computer-executable code 735 including instructions that, when executed by the processor 740, cause the device 705 to perform various functions described herein. In some examples, the memory 730 may contain, among other things, a basic input and output (I/O) system (BIOS) which may control basic hardware or software operation such as the interaction with peripheral components or devices.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705. For example, the processor 740 may execute the frame formation and exchange software module to facilitate the creation and exchange of frames (such as management frames, control frames, and data frames). The processor 740 also may execute the AP/band switching software module to facilitate switching the association of a STA between APs, or to facilitate switching the operation of a STA between different frequency bands, or both.

The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The inter-AP communications manager 745 may manage communications with other APs 160, and may include a controller or scheduler for controlling communications with STAs in cooperation with other APs 160. For example, the inter-AP communications manager 745 may coordinate scheduling for transmissions to APs 160 for various interference mitigation techniques such as beamforming or joint transmission. In some examples, the inter-AP communications manager 745 may provide an X2 interface within an LTE/LTE-A wireless communication network technology to provide communication between APs 160.

For example, the communications manager 720 may be configured as or otherwise support a means for connecting with one or more components of a BS via a cellular modem associated with the access device. The communications manager 720 may be configured as or otherwise support a means for obtaining, from the cellular modem associated with the access device, one or more communication parameters associated with a connection state of the cellular modem with the BS. The communications manager 720 may be configured as or otherwise support a means for selecting a power mode for a WLAN AP associated with the access device in accordance with the one or more communication parameters associated with the connection state of the cellular modem. The communications manager 720 may be configured as or otherwise support a means for communicating with one or more STAs served by the access device using the WLAN AP in accordance with the connection state of the cellular modem and the power mode for the WLAN AP.

In some examples, obtaining the one or more communication parameters associated with the connection state of the cellular modem includes obtaining an indication that the cellular modem is transitioning to an RRC idle state. In some examples, selecting the power mode for the WLAN AP includes allowing a sleep mode for the one or more STAs served by the access device.

In some examples, obtaining the one or more communication parameters associated with the connection state of the cellular modem includes obtaining an indication that the cellular modem is transitioning to an RRC inactive state. In some examples, selecting the power mode for the WLAN AP includes allowing or rejecting a sleep mode for the one or more STAs served by the access device based on a DRX mode of the cellular modem.

In some examples, to support allowing or rejecting the sleep mode for the one or more STAs served by the access device, the communications manager 720 may be configured as or otherwise support a means for rejecting the sleep mode for the one or more STAs served by the access device.

In some examples, to support allowing or rejecting the sleep mode for the one or more STAs served by the access device, the communications manager 720 may be configured as or otherwise support a means for allowing the sleep mode for the one or more STAs served by the access device.

In some examples, obtaining the one or more communication parameters associated with the connection state of the cellular modem includes obtaining an indication that the cellular modem is transitioning to an RRC connected state. In some examples, selecting the power mode for the WLAN AP includes rejecting a sleep mode for the one or more STAs served by the access device.

In some examples, obtaining the one or more communication parameters associated with the connection state of the cellular modem includes obtaining an indication that a low latency traffic flow is mapped to a STA of the one or more STAs served by the access device. In some examples, selecting the power mode for the WLAN AP includes rejecting a sleep mode for the STA.

In some examples, obtaining the one or more communication parameters associated with the connection state of the cellular modem includes obtaining an indication that a non-low latency traffic flow is scheduled for a STA of the one or more STAs served by the access device. In some examples, selecting the power mode for the WLAN AP includes allowing a sleep mode for the STA.

In some examples, obtaining the one or more communication parameters associated with the connection state of the cellular modem includes obtaining an indication of a PDU session type associated with a low latency traffic flow that is scheduled for a STA of the one or more STAs served by the access device. In some examples, selecting the power mode for the WLAN AP includes rejecting a sleep mode for the STA.

In some examples, the communications manager 720 may be configured as or otherwise support a means for obtaining a sleep mode state for a STA of the one or more STAs served by the access device that is associated with a traffic flow having a priority greater than a threshold priority. In some examples, the communications manager 720 may be configured as or otherwise support a means for scheduling communication to the STA that is associated with the traffic flow having the priority greater than the threshold priority in accordance with the sleep mode state for the STA, where communicating with the one or more STAs served by the access device using the WLAN AP is based on scheduling communication to the STA in accordance with the sleep mode state for the STA.

In some examples, the one or more communication parameters associated with the connection state of the cellular modem includes an indication of an RRC connection state transition, a PDU session type, a DRX mode, a RAT transition, a radio frequency band transition, a QoS condition of a traffic flow, a priority of a traffic flow, or a combination thereof.

Figure 8:
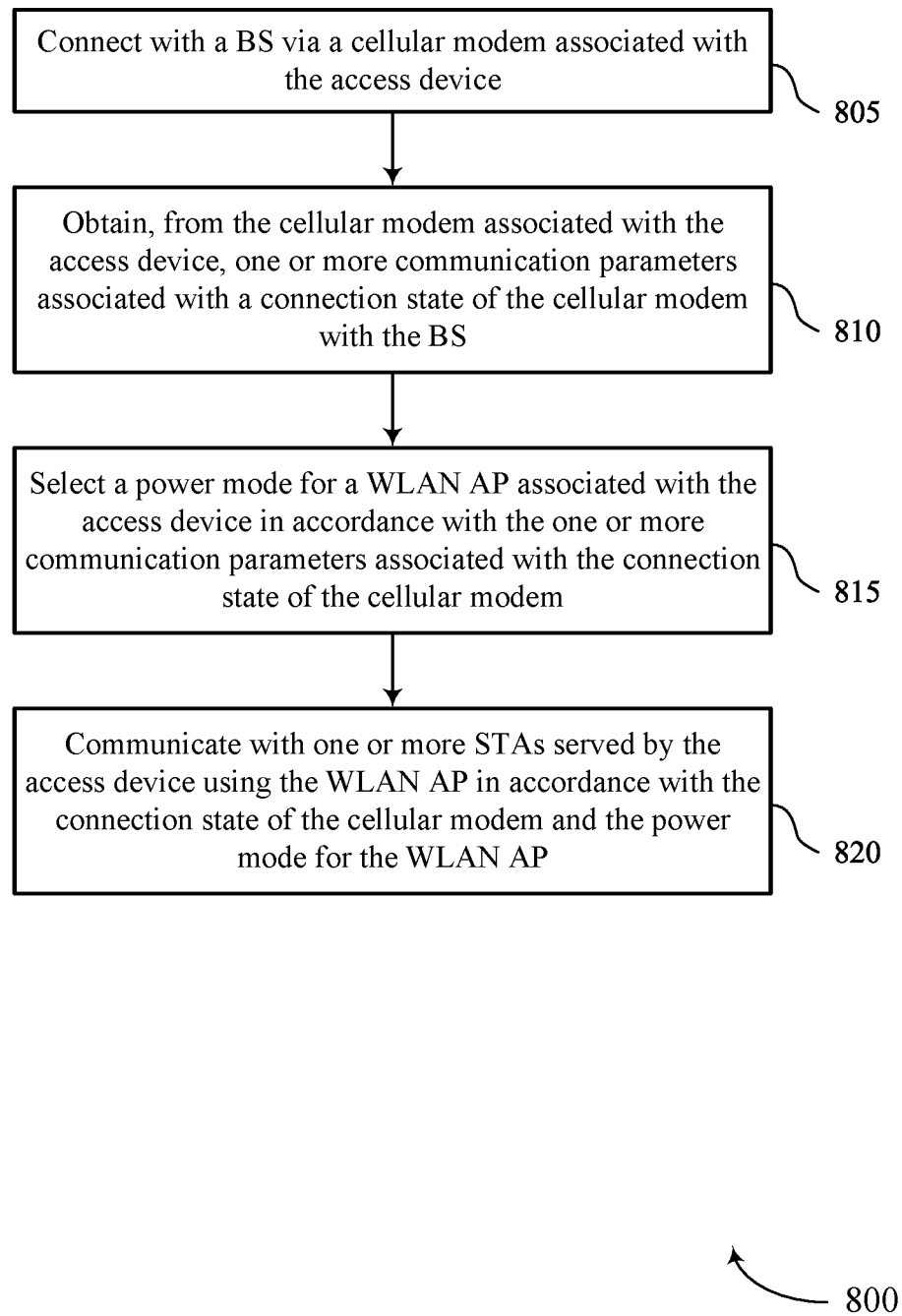
FIG. 8 shows a flowchart illustrating an example method that supports 5G radio-aware power management at a WLAN AP in FWA deployments.

FIG. 8 shows a flowchart illustrating an example method 800 that supports 5G radio-aware power management at a WLAN AP in FWA deployments. The operations of the method 800 may be implemented by an AP or its components as described herein. For example, the operations of the method 800 may be performed by an AP as described with reference to FIGS. 1-7. In some examples, an AP may execute a set of instructions to control the functional elements of the AP to perform the described functions. Additionally, or alternatively, the AP may perform aspects of the described functions using special-purpose hardware.

At 805, the method may include connecting with one or more components of a BS via a cellular modem associated with the access device. The operations of 805 may be performed in accordance with examples as disclosed herein.

At 810, the method may include obtaining, from the cellular modem associated with the access device, one or more communication parameters associated with a connection state of the cellular modem with the BS. The operations of 810 may be performed in accordance with examples as disclosed herein.

At 815, the method may include selecting a power mode for a WLAN AP associated with the access device in accordance with the one or more communication parameters associated with the connection state of the cellular modem. The operations of 815 may be performed in accordance with examples as disclosed herein.

At 820, the method may include communicating with one or more STAs served by the access device using the WLAN AP in accordance with the connection state of the cellular modem and the power mode for the WLAN AP. The operations of 820 may be performed in accordance with examples as disclosed herein.

The following provides an overview of some aspects of the present disclosure:

Aspect 1: A method of wireless communication by an access device, including: connecting with a BS via a cellular modem associated with the access device; obtaining, from the cellular modem associated with the access device, one or more communication parameters associated with a connection state of the cellular modem with the BS; selecting a power mode for a WLAN AP associated with the access device in accordance with the one or more communication parameters associated with the connection state of the cellular modem; and communicating with one or more STAs served by the access device using the WLAN AP in accordance with the connection state of the cellular modem and the power mode for the WLAN AP.

Aspect 2: The method of aspect 1, where obtaining the one or more communication parameters associated with the connection state of the cellular modem includes obtaining an indication that the cellular modem is transitioning to an RRC idle state; and selecting the power mode for the WLAN AP includes allowing a sleep mode for the one or more STAs served by the access device.

Aspect 3: The method of aspect 1, where obtaining the one or more communication parameters associated with the connection state of the cellular modem includes obtaining an indication that the cellular modem is transitioning to an RRC inactive state; and selecting the power mode for the WLAN AP includes allowing or rejecting a sleep mode for the one or more STAs served by the access device based at least in part on a DRX mode of the cellular modem.

Aspect 4: The method of aspect 3, where the DRX mode of the cellular modem includes a short DRX mode, and where allowing or rejecting the sleep mode for the one or more STAs served by the access device includes: rejecting the sleep mode for the one or more STAs served by the access device.

Aspect 5: The method of aspect 3, where the DRX mode of the cellular modem includes a long DRX mode, and where allowing or rejecting the sleep mode for the one or more STAs served by the access device includes: allowing the sleep mode for the one or more STAs served by the access device.

Aspect 6: The method of aspect 1, where obtaining the one or more communication parameters associated with the connection state of the cellular modem includes obtaining an indication that the cellular modem is transitioning to an RRC connected state; and selecting the power mode for the WLAN AP includes rejecting a sleep mode for the one or more STAs served by the access device.

Aspect 7: The method of any of aspects 1 through 6, where obtaining the one or more communication parameters associated with the connection state of the cellular modem includes obtaining an indication that a low latency traffic flow is mapped to a STA of the one or more STAs served by the access device; and selecting the power mode for the WLAN AP includes rejecting a sleep mode for the STA.

Aspect 8: The method of any of aspects 1 through 6, where obtaining the one or more communication parameters associated with the connection state of the cellular modem includes obtaining an indication that a non-low latency traffic flow is scheduled for a STA of the one or more STAs served by the access device; and selecting the power mode for the WLAN AP includes allowing a sleep mode for the STA.

Aspect 9: The method of any of aspects 1 through 8, where obtaining the one or more communication parameters associated with the connection state of the cellular modem includes obtaining an indication of a PDU session type associated with a low latency traffic flow that is scheduled for a STA of the one or more STAs served by the access device; and selecting the power mode for the WLAN AP includes rejecting a sleep mode for the STA.

Aspect 10: The method of any of aspects 1 through 9, further including: obtaining a sleep mode state for a STA of the one or more STAs served by the access device that is associated with a traffic flow having a priority greater than a threshold priority; and scheduling communication to the STA that is associated with the traffic flow having the priority greater than the threshold priority in accordance with the sleep mode state for the STA, where communicating with the one or more STAs served by the access device using the WLAN AP is based at least in part on scheduling communication to the STA in accordance with the sleep mode state for the STA.

Aspect 11: The method of any of aspects 1 through 10, where the one or more communication parameters associated with the connection state of the cellular modem includes an indication of an RRC connection state transition, a PDU session type, a DRX mode, an RAT transition, a radio frequency band transition, a QoS condition of a traffic flow, a priority of a traffic flow, or a combination thereof.

Aspect 12: An apparatus for wireless communication at a UE, including at least a first interface, a processing system, and a second interface configured to cause the apparatus to perform a method of any of aspects 1-11.

Aspect 13: An apparatus including a processor; memory coupled with the processor; and instructions stored in the memory and executable by the processor to cause the apparatus to perform a method of any of aspects 1-11.

Aspect 14: An apparatus including at least one means for performing a method of any of aspects 1-11.

Aspect 15: A non-transitory computer-readable medium storing code the code including instructions executable by a processor to perform a method of any of aspects 1-11.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at an access device, comprising:
 a first interface configured to:
  connect with an access network entity via a cellular modem associated with the access device;
 the first interface or a second interface configured to:
  obtain, from the cellular modem associated with the access device, one or more communication parameters associated with a connection state of the cellular modem with the access network entity, wherein the connection state comprises a radio resource control (RRC) state of the cellular modem;
 a processing system configured to:
  select a power mode for a wireless local area network (WLAN) access point (AP) associated with the access device in accordance with the one or more communication parameters associated with the connection state of the cellular modem, wherein selecting the power mode for the WLAN AP comprises:
   allowing a sleep mode for one or more stations (STAs) served by the access device via the WLAN AP and the access network entity via the cellular modem based at least in part on the RRC state of the cellular modem comprising a RRC idle state;
   allowing or rejecting the sleep mode for the one or more STAs based at least in part on the RRC state of the cellular modem comprising a RRC inactive state; or
   rejecting the sleep mode for the one or more STAs based at least in part on the RRC state of the cellular modem comprising a RRC connected state; and
 the second interface configured to:
  communicate with the one or more STAs served by the access device via the WLAN AP and the access network entity via the cellular modem in accordance with the connection state of the cellular modem and the power mode for the WLAN AP.

2. The apparatus of claim 1, wherein:
 obtaining the one or more communication parameters associated with the connection state of the cellular modem comprises obtaining an indication that the cellular modem is transitioning to the RRC idle state; and
 selecting the power mode for the WLAN AP comprises allowing the sleep mode for the one or more STAs served by the access device.

3. The apparatus of claim 1, wherein:
 obtaining the one or more communication parameters associated with the connection state of the cellular modem comprises obtaining an indication that the cellular modem is transitioning to the RRC inactive state; and
 selecting the power mode for the WLAN AP comprises allowing or rejecting the sleep mode for the one or more STAs served by the access device based at least in part on a discontinuous reception (DRX) mode of the cellular modem.

4. The apparatus of claim 3, wherein allowing or rejecting the sleep mode for the one or more STAs served by the access device further comprises:
 rejecting the sleep mode for the one or more STAs served by the access device.

5. The apparatus of claim 3, wherein allowing or rejecting the sleep mode for the one or more STAs served by the access device further comprises:
 allowing the sleep mode for the one or more STAs served by the access device.

6. The apparatus of claim 1, wherein:
 obtaining the one or more communication parameters associated with the connection state of the cellular modem comprises obtaining an indication that the cellular modem is transitioning to the RRC connected state; and
 selecting the power mode for the WLAN AP comprises rejecting the sleep mode for the one or more STAs served by the access device.

7. The apparatus of claim 1, wherein:
 obtaining the one or more communication parameters associated with the connection state of the cellular modem comprises obtaining an indication that a low latency traffic flow is mapped to a STA of the one or more STAs served by the access device; and
 selecting the power mode for the WLAN AP comprises rejecting the sleep mode for the STA.

8. The apparatus of claim 1, wherein:
 obtaining the one or more communication parameters associated with the connection state of the cellular modem comprises obtaining an indication that a non-low latency traffic flow is scheduled for a STA of the one or more STAs served by the access device; and
 selecting the power mode for the WLAN AP comprises allowing the sleep mode for the STA.

9. The apparatus of claim 1, wherein:
 obtaining the one or more communication parameters associated with the connection state of the cellular modem comprises obtaining an indication of a protocol data unit (PDU) session type associated with a low latency traffic flow that is scheduled for a STA of the one or more STAs served by the access device; and
 selecting the power mode for the WLAN AP comprises rejecting the sleep mode for the STA.

10. The apparatus of claim 1, wherein the processing system is further configured to:
 obtain a sleep mode state for a STA of the one or more STAs served by the access device that is associated with a traffic flow having a priority greater than a threshold priority; and schedule communication to the STA that is associated with the traffic flow having the priority greater than the threshold priority in accordance with the sleep mode state for the STA, wherein communicating with the one or more STAs served by the access device using the WLAN AP is based at least in part on scheduling communication to the STA in accordance with the sleep mode state for the STA.

11. The apparatus of claim 1, wherein the one or more communication parameters associated with the connection state of the cellular modem comprises an indication of a RRC connection state transition, a protocol data unit (PDU) session type, a discontinuous reception (DRX) mode, a radio access technology (RAT) transition, a radio frequency band transition, a quality of service (QoS) condition of a traffic flow, a priority of a traffic flow, or a combination thereof.

12. A method of wireless communication by an access device, comprising:
  connecting with an access network entity via a cellular modem associated with the access device;
  obtaining, from the cellular modem associated with the access device, one or more communication parameters associated with a connection state of the cellular modem with the access network entity, wherein the connection state comprises a radio resource control (RRC) state of the cellular modem;
  selecting a power mode for a wireless local area network (WLAN) access point (AP) associated with the access device in accordance with the one or more communication parameters associated with the connection state of the cellular modem, wherein selecting the power mode for the WLAN AP comprises:
    allowing a sleep mode for one or more stations (STAs) served by the access device via the WLAN AP and the access network entity via the cellular modem based at least in part on the RRC state of the cellular modem comprising a RRC idle state;
    allowing or rejecting the sleep mode for the one or more STAs based at least in part on the RRC state of the cellular modem comprising a RRC inactive state; or
    rejecting the sleep mode for the one or more STAs based at least in part on the RRC state of the cellular modem comprising a RRC connected state; and
  communicating with the one or more STAs served by the access device via the WLAN AP and the access network entity via the cellular modem in accordance with the connection state of the cellular modem and the power mode for the WLAN AP.

13. The method of claim 12, wherein:
obtaining the one or more communication parameters associated with the connection state of the cellular modem comprises obtaining an indication that the cellular modem is transitioning to the RRC idle state; and
selecting the power mode for the WLAN AP comprises allowing the sleep mode for the one or more STAs served by the access device.

14. The method of claim 12, wherein:
obtaining the one or more communication parameters associated with the connection state of the cellular modem comprises obtaining an indication that the cellular modem is transitioning to the RRC inactive state; and
selecting the power mode for the WLAN AP comprises allowing or rejecting the sleep mode for the one or more STAs served by the access device based at least in part on a discontinuous reception (DRX) mode of the cellular modem.

15. The method of claim 14, wherein the DRX mode of the cellular modem comprises a short DRX mode, and wherein allowing or rejecting the sleep mode for the one or more STAs served by the access device comprises:
  rejecting the sleep mode for the one or more STAs served by the access device.

16. The method of claim 14, wherein the DRX mode of the cellular modem comprises a long DRX mode, and wherein allowing or rejecting the sleep mode for the one or more STAs served by the access device comprises:
  allowing the sleep mode for the one or more STAs served by the access device.

17. The method of claim 12, wherein:
obtaining the one or more communication parameters associated with the connection state of the cellular modem comprises obtaining an indication that the cellular modem is transitioning to the RRC connected state; and
selecting the power mode for the WLAN AP comprises rejecting the sleep mode for the one or more STAs served by the access device.

18. The method of claim 12, wherein:
obtaining the one or more communication parameters associated with the connection state of the cellular modem comprises obtaining an indication that a low latency traffic flow is mapped to a STA of the one or more STAs served by the access device; and
selecting the power mode for the WLAN AP comprises rejecting the sleep mode for the STA.

19. The method of claim 12, wherein:
obtaining the one or more communication parameters associated with the connection state of the cellular modem comprises obtaining an indication that a non-low latency traffic flow is scheduled for a STA of the one or more STAs served by the access device; and
selecting the power mode for the WLAN AP comprises allowing the sleep mode for the STA.

20. The method of claim 12, wherein:
obtaining the one or more communication parameters associated with the connection state of the cellular modem comprises obtaining an indication of a protocol data unit (PDU) session type associated with a low latency traffic flow that is scheduled for a STA of the one or more STAs served by the access device; and
selecting the power mode for the WLAN AP comprises rejecting the sleep mode for the STA.

21. The method of claim 12, further comprising:
obtaining a sleep mode state for a STA of the one or more STAs served by the access device that is associated with a traffic flow having a priority greater than a threshold priority; and
scheduling communication to the STA that is associated with the traffic flow having the priority greater than the threshold priority in accordance with the sleep mode state for the STA, wherein communicating with the one or more STAs served by the access device using the WLAN AP is based at least in part on scheduling communication to the STA in accordance with the sleep mode state for the STA.

22. The method of claim 12, wherein the one or more communication parameters associated with the connection state of the cellular modem comprises an indication of a RRC connection state transition, a protocol data unit (PDU) session type, a discontinuous reception (DRX) mode, a radio access technology (RAT) transition, a radio frequency band transition, a quality of service (QoS) condition of a traffic flow, a priority of a traffic flow, or a combination thereof.

23. An apparatus for wireless communication at an access device, comprising:
means for connecting with an access network entity via a cellular modem associated with the access device;
means for obtaining, from the cellular modem associated with the access device, one or more communication parameters associated with a connection state of the cellular modem with the access network entity, wherein the connection state comprises a radio resource control (RRC) state of the cellular modem;
means for selecting a power mode for a wireless local area network (WLAN) access point (AP) associated with the access device in accordance with the one or more communication parameters associated with the connection state of the cellular modem, wherein selecting the power mode for the WLAN AP comprises:
allowing a sleep mode for one or more stations (STAs) served by the access device via the WLAN AP and the access network entity via the cellular modem based at least in part on the RRC state of the cellular modem comprising a RRC idle state;
allowing or rejecting the sleep mode for the one or more STAs based at least in part on the RRC state of the cellular modem comprising a RRC inactive state; or
rejecting the sleep mode for the one or more STAs based at least in part on the RRC state of the cellular modem comprising a RRC connected state; and
means for communicating with the one or more STAs served by the access device via the WLAN AP and the access network entity via the cellular modem in accordance with the connection state of the cellular modem and the power mode for the WLAN AP.

24. The apparatus of claim 23, wherein:
obtaining the one or more communication parameters associated with the connection state of the cellular modem comprises obtaining an indication that the cellular modem is transitioning to the RRC idle state; and
selecting the power mode for the WLAN AP comprises allowing the sleep mode for the one or more STAs served by the access device.

25. The apparatus of claim 23, wherein:
obtaining the one or more communication parameters associated with the connection state of the cellular modem comprises obtaining an indication that the cellular modem is transitioning to the RRC inactive state; and
selecting the power mode for the WLAN AP comprises allowing or rejecting the sleep mode for the one or more STAs served by the access device based at least in part on a discontinuous reception (DRX) mode of the cellular modem.

26. The apparatus of claim 23, wherein:
obtaining the one or more communication parameters associated with the connection state of the cellular modem comprises obtaining an indication that the cellular modem is transitioning to the RRC connected state; and
selecting the power mode for the WLAN AP comprises rejecting the sleep mode for the one or more STAs served by the access device.

27. A non-transitory computer-readable medium storing code for wireless communication at an access device, the code comprising instructions executable by a processor to:
connect with an access network entity via a cellular modem associated with the access device;
obtain, from the cellular modem associated with the access device, one or more communication parameters associated with a connection state of the cellular modem with the access network entity, wherein the connection state comprises a radio resource control (RRC) state of the cellular modem;
select a power mode for a wireless local area network (WLAN) access point (AP) associated with the access device in accordance with the one or more communication parameters associated with the connection state of the cellular modem, wherein selecting the power mode for the WLAN AP comprises:
allowing a sleep mode for one or more stations (STAs) served by the access device via the WLAN AP and the access network entity via the cellular modem based at least in part on the RRC state of the cellular modem comprising a RRC idle state;
allowing or rejecting the sleep mode for the one or more STAs based at least in part on the RRC state of the cellular modem comprising a RRC inactive state; or
rejecting the sleep mode for the one or more STAs based at least in part on the RRC state of the cellular modem comprising a RRC connected state; and
communicate with the one or more STAs served by the access device via the WLAN AP and the access network entity via the cellular modem in accordance with the connection state of the cellular modem and the power mode for the WLAN AP.

28. The non-transitory computer-readable medium of claim 27, wherein:
obtaining the one or more communication parameters associated with the connection state of the cellular modem comprises obtaining an indication that the cellular modem is transitioning to the RRC idle state; and
selecting the power mode for the WLAN AP comprises allowing the sleep mode for the one or more STAs served by the access device.

29. The non-transitory computer-readable medium of claim 27, wherein:
obtaining the one or more communication parameters associated with the connection state of the cellular modem comprises obtaining an indication that the cellular modem is transitioning to the RRC inactive state; and
selecting the power mode for the WLAN AP comprises allowing or rejecting the sleep mode for the one or more STAs served by the access device based at least in part on a discontinuous reception (DRX) mode of the cellular modem.

30. The non-transitory computer-readable medium of claim 27, wherein:
obtaining the one or more communication parameters associated with the connection state of the cellular modem comprises obtaining an indication that the cellular modem is transitioning to the RRC connected state; and
selecting the power mode for the WLAN AP comprises rejecting the sleep mode for the one or more STAs served by the access device.

* * * * *